(12) United States Patent
Hayashikawa et al.

(10) Patent No.: US 6,580,742 B1
(45) Date of Patent: Jun. 17, 2003

(54) LASER OSCILLATING APPARATUS

(75) Inventors: Hiroyuki Hayashikawa, Osaka (JP);
Tetsuji Nishimura, Osaka (JP); Hitoshi Hongu, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 129 days.

(21) Appl. No.: 09/689,072

(22) Filed: Oct. 12, 2000

(30) Foreign Application Priority Data

Oct. 12, 1999 (JP) .......................................... 11-289549
Oct. 12, 1999 (JP) .......................................... 11-289550
Oct. 12, 1999 (JP) .......................................... 11-289551

(51) Int. Cl.[7] .............................. H01S 3/22; H01S 3/223
(52) U.S. Cl. .............................. 372/58; 372/61; 372/90
(58) Field of Search .............................. 372/57, 58, 61

(56) References Cited

U.S. PATENT DOCUMENTS

| | | | | |
|---|---|---|---|---|
| 4,760,582 A | * | 7/1988 | Jeffers ........................... | 372/89 |
| 4,799,231 A | * | 1/1989 | Smith et al. ................... | 372/58 |
| 5,373,523 A | * | 12/1994 | Fujimoto et al. ............. | 372/59 |
| 5,426,659 A | * | 6/1995 | Sugiyama et al. ............ | 372/58 |
| 5,450,435 A | * | 9/1995 | Yamane et al. ............... | 372/58 |
| 5,889,807 A | * | 3/1999 | Cunningham et al. ........ | 372/55 |
| 5,898,723 A | * | 4/1999 | Le Guyadec et al. ........ | 372/56 |

* cited by examiner

*Primary Examiner*—Paul Ip
*Assistant Examiner*—Davienne Monbleau
(74) *Attorney, Agent, or Firm*—RatnerPrestia

(57) ABSTRACT

An orifice (254) is disposed near the junction of a discharge tube (1) and a laser gas lead-in pipe (242). A laser gas relay pipe (244) is disposed so as to allow the laser gas to flow parallel in the same direction as or in the reverse direction to the flowing direction of laser gas in the discharge tube (1). The orifice (254) includes a portion for impeding flow of laser gas, and plural holes for passing laser gas, and at least one of the holes is deviated from the center. The total area of the holes summing up the area of the plural holes provided in the orifice (254) is at a rate of 0.5 to 0.8 to the sectional area of the discharge tube. The plural holes of the orifice (254) are nearly circular, and the diameter of each hole is smaller than the radius of the orifice.

19 Claims, 25 Drawing Sheets

LASER OSCILLATING APPARATUS

FIELD OF THE INVENTION

The present invention relates to an axial flow type gas laser oscillating apparatus for passing laser gas in a discharge tube.

BACKGROUND OF THE INVENTION

FIG. 37 shows an example of a schematic structure of a gas laser oscillating apparatus known as axial flow type. Referring to FIG. 37, the axial flow type gas laser oscillating apparatus (hereinafter referred to simply as "AFGLO") is explained below. As shown in FIG. 37, the AFGLO is mainly composed of a laser resonator, a power supply unit, and a laser gas circulation part.

The laser resonator further comprises a discharge tube 1 having a discharge area 5, a rear mirror (hereinafter referred to simply as "RM") 6, and an output mirror (hereinafter referred to simply as "OPM") 7. The discharge tube (hereinafter referred to simply as "DT") 1 is composed of glass or other dielectric material, and electrodes 2, 3 are provided near both ends of the DT 1. In the space of the DT 1 enclosed by the electrodes 2, 3, the discharge area (hereinafter referred to simply as "DA") 5 is formed. Plural DAs 5 are disposed between the RM 6 and OPM 7. The RM 6 is a reflector having a reflectivity of about 100%. The OPM 7 is a partial reflector, and a laser beam 8 is emitted from the OPM 7.

The power supply unit 4 is connected to the electrodes 2, 3 in order to discharge in the DA 5.

The laser gas circulating part (hereinafter referred to simply as "LGCP") comprises a blower 13, heat exchangers 11, 12, a laser gas passage 10, DT 1, and a laser gas lead-in part 14. The laser gas lead-in part 14 is a part for leading the laser gas into the DT 1 from the laser gas passage 10. The laser gas circulates the LGCP for composing the AFGLO in the direction of arrow 9. The blower 13 is for circulating the laser gas. By this blower 13, the flow velocity of laser gas is set around 100 m/sec in the DA 5 of the DT 1. The pressure of the LGCP is about 100 to 200 Torr. When a specific voltage is applied from the power supply unit 4, the DA 5 discharges. By this discharge and operation of the blower, the temperature of the laser gas climbs up. The heat exchangers 11 and 12 are for cooling the heated laser gas.

This is a structure of the conventional AFGLO, and its operation is explained.

The laser gas sent out from the blower 13 passes through the laser gas passage 10, and is led into the DT 1 through the lead-in part 14. In this state, when a specific voltage is applied to the electrodes 2, 3 from the power supply unit 4, the DA 5 discharges. The laser gas in the DA 5 obtains this discharge energy and is excited. The excited laser gas is resonated by the laser resonator composed of the RM 6 and OPM 7. As a result, a laser beam 8 is emitted from the OPM 7. This emitted laser beam 8 is utilized in laser processing and other applications.

Such conventional AFGLO had the following problems.

In the gas laser apparatus, the flow of laser gas in the DT 1 is preferred to be uniform from introduction of gas into the discharge tube until discharge, as far as possible, in the gas flow direction. If the gas flow is uniform, a stable discharge is obtained in the DA 5. When the discharge is stable, the laser output from an electric input injected for discharge becomes higher. That is, the efficiency of laser output is high in terms of the injected electric input. To make the laser gas uniform in the DT 1, the laser gas lead-in part may be formed coaxially with the DT 1. However, due to structural characteristics of the AFGLO, it is difficult to install the laser gas lead-in part coaxially with the DT 1. Accordingly, as shown in partial sectional views of the lead-in part 14 and DT 1 in FIG. 38 and FIG. 39 (FIG. 39 being a sectional view along line 39—39 in FIG. 38), the laser gas lead-in part 14 is composed of a lead-in pipe 142 disposed nearly at right angle to the DT 1, and a chamber 144 communicating with the laser gas passage 10 at the upstream side of the lead-in pipe 142. The laser gas flows from the chamber 144 into the DT 1 through the lead-in pipe 142. In this structure, the laser output characteristic (L102) is shown in FIG. 40. FIG. 40 shows the laser output with respect to the electric input to the discharge tube. In FIG. 40, the axis of abscissas denotes the discharge electric input, and the axis of ordinates represents the laser output. As shown in FIG. 40, as the discharge electric input into the DT 1 increases, the laser output saturates. In this structure, the discharge tended to be deviated in the outer circumference of the discharge tube. This deviation of discharge is visually recognized. Considering from this deviation of discharge, it is estimated that the gas flow is not uniform in the discharge tube. For example, the flow of laser gas from the lead-in pipe 14 into the DT 1 is estimated as shown in FIG. 41, that is, a gas flow disturbance (vortex) 18 is formed in the DT 1, especially near the gas lead-in pipe 142.

Further, as shown in partial sectional views of the lead-in part 14 and DT 1 in FIG. 42 and FIG. 43 (FIG. 43 being a sectional view along line 43—43 in FIG. 42), an orifice 15 is disposed between the DT 1 and the lead-in pipe 14. The orifice 15 is composed of a portion for impeding the flow of laser gas, and one hole 16 for passing laser gas. The hole 16 of the orifice 15 is deviated from the center. In this case, the laser output characteristic (L104) is as shown in FIG. 44. As clear from FIG. 44, as the discharge electric input into the DT 1 increases, the laser output saturates, but as compared with the structure shown in FIG. 38, the laser output is slightly improved. However, in this structure, too, same as in the structure in FIG. 38, the discharge tended to be deviated into the outer circumference of the discharge tube. Considering from this result, for example, the flow of laser gas from the lead-in pipe 142 into the DT 1 is estimated as shown in FIG. 45, that is, a gas flow disturbance (vortex) 18 is formed in the DT 1, especially near the gas lead-in pipe 142.

Further, for example, Japanese Laid-open Patent No. 7-142787 discloses a structure in which a chamber for temporarily storing gas is provided, and it is connected to the laser gas lead-in part. This structure is intended to eliminate deviation of gas flow in the discharge tube by canceling directivity of laser gas flowing into the laser gas lead-in part. Also by disposing the laser gas lead-in part in a ring form around the discharge tube, it is attempted to dispose the laser gas lead-in part coaxially with the discharge tube. As investigated by the present inventors, in a same structure as in Japanese Laid-open Patent No. 7-142787, it is found that the laser gas flow in the discharge tube tends to deviate the discharge either into the central part or into the outer circumference of the discharge tube. This deviation of discharge can be visually recognized. Considering from this deviation of discharge, it is estimated that the gas flow is not uniform in the discharge tube. Besides, the structure is complicated.

SUMMARY OF THE INVENTION

To solve the above problems, the invention comprises a discharge tube for passing laser gas inside and exciting laser gas, a laser gas lead-in pipe connected to the discharge tube for leading the laser gas into the discharge tube, and a laser gas relay pipe for supplying laser gas into the laser gas lead-in pipe, and having a portion for allowing the laser gas to flow parallel to the flowing direction of the laser gas in the discharge tube. The flowing direction of laser gas in the laser gas relay pipe is parallel to and in the same direction as the flowing direction of the laser gas in the discharge tube.

The invention further comprises a discharge tube for passing laser gas inside and exciting laser gas, a laser gas lead-in pipe connected to the discharge tube for leading the laser gas into the discharge tube, and an orifice disposed near the junction of the discharge tube and laser gas lead-in part, in which the orifice is formed of a portion for impeding the flow of laser gas and plural holes for passing laser gas, and at least one hole is deviated from the center.

Moreover, the invention comprises a discharge tube for passing laser gas inside and exciting laser gas, a laser gas lead-in pipe connected to the discharge tube for leading the laser gas into the discharge tube, a laser gas relay pipe for supplying laser gas into the laser gas lead-in part, and an orifice disposed near the junction of the laser gas lead-in pipe and discharge tube, in which the laser gas relay pipe has a portion of allowing the laser gas to flow parallel to the flowing direction of laser gas in the discharge tube, and the orifice is formed of a portion for impeding the flow of laser gas and plural holes for passing laser gas, and at least one hole is deviated from the center.

DETAILED DESCRIPTION OF THE PREFERRED EMBODIMENTS

Figure 37:
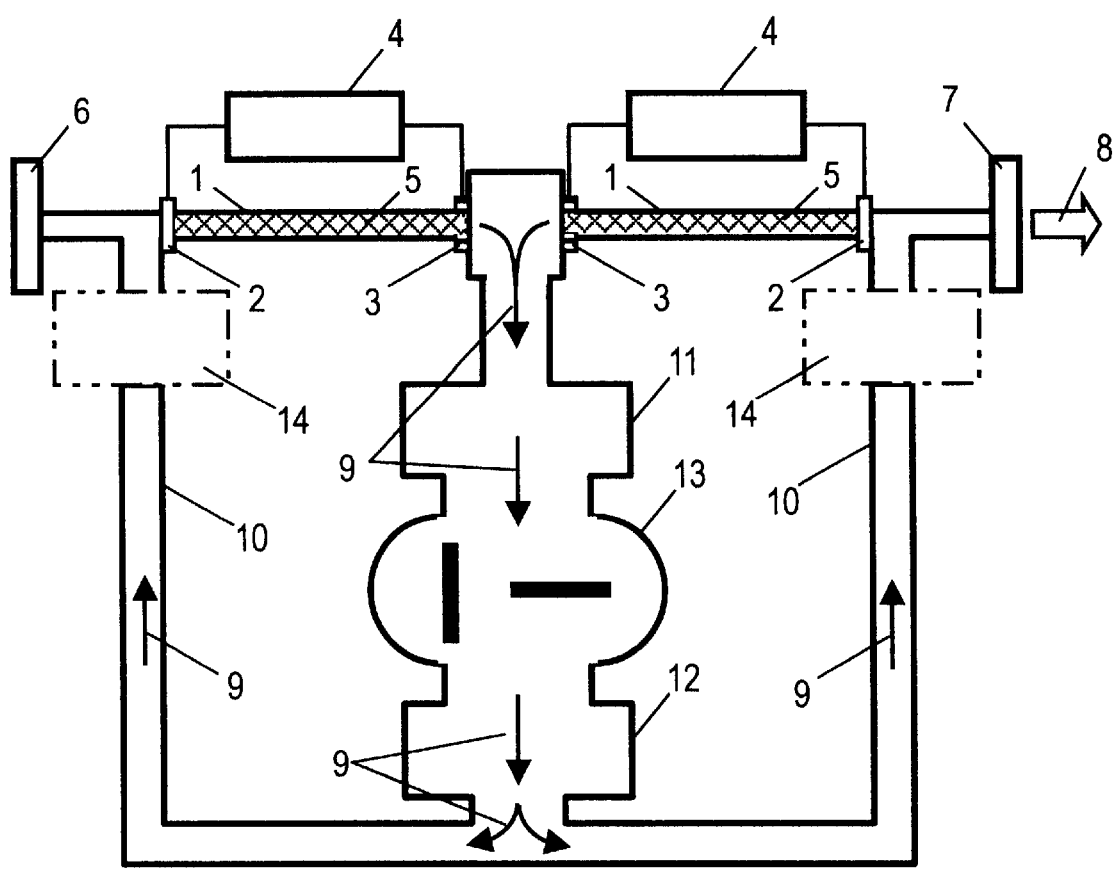
FIG. 37 shows an example of schematic structure of a gas laser oscillating apparatus called axial flow type.
Figure 38:
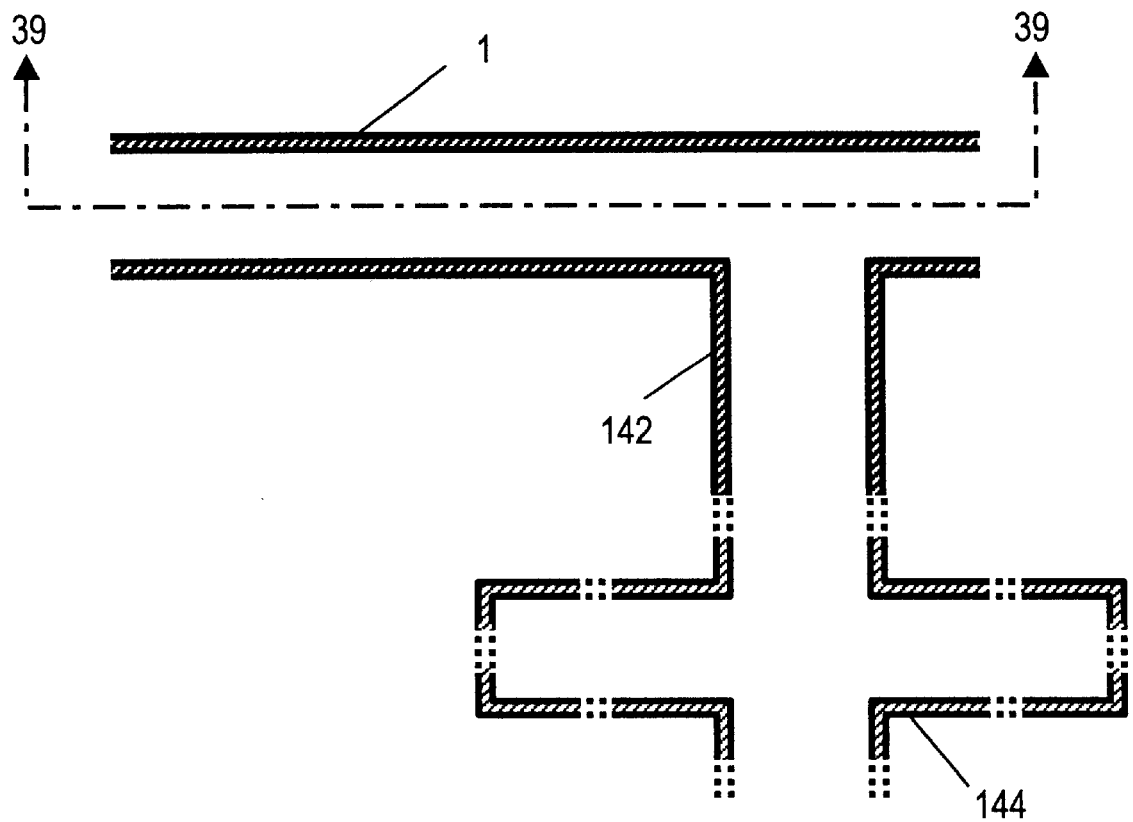
FIG. 38 is a partial sectional view of laser gas lead-in part 14 and DT 1 of a conventional gas laser oscillating apparatus.
Figure 39:
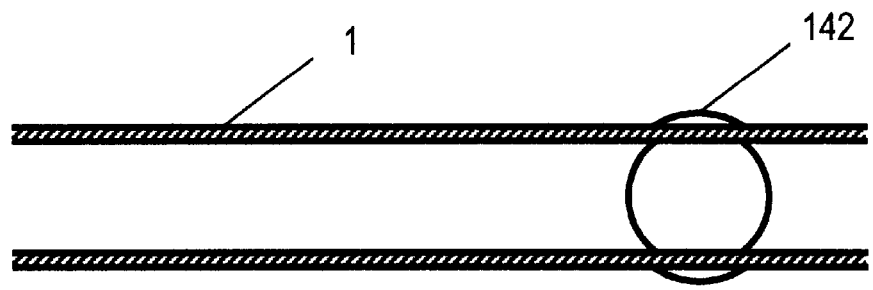
FIG. 39 is a sectional view along line 39—39 shown in FIG. 38.
Figure 40:
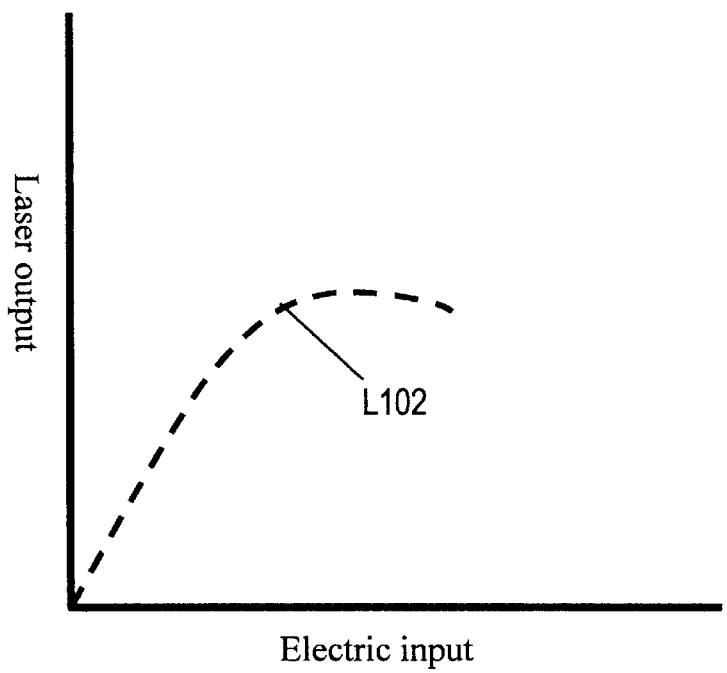
FIG. 40 shows the laser output in terms of electric input to discharge tube in the conventional gas laser oscillating apparatus.
Figure 41:
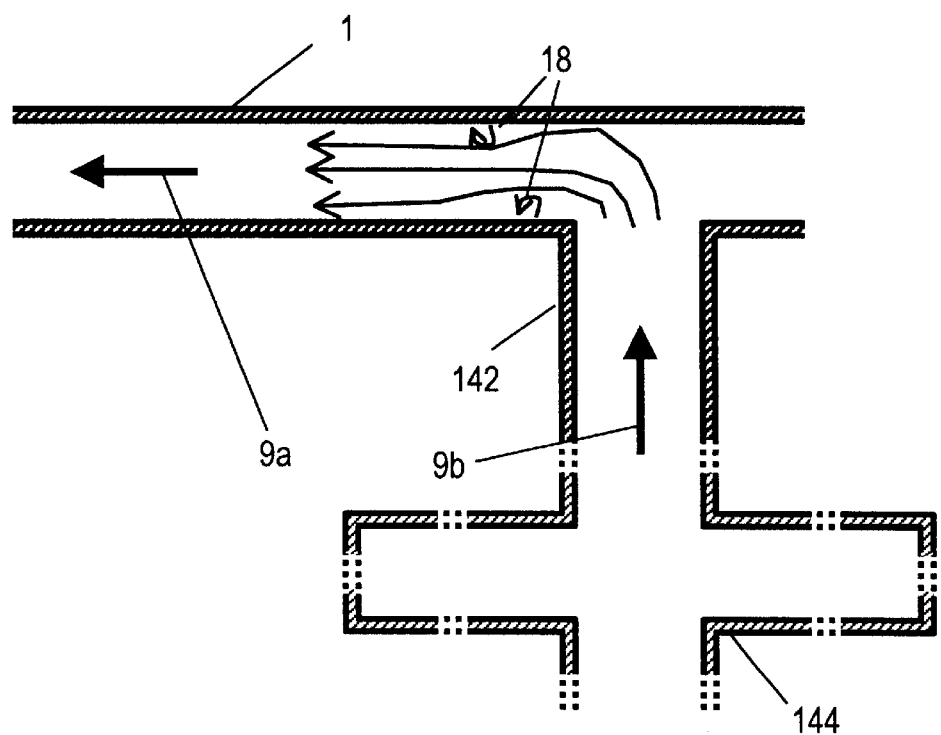
FIG. 41 is a schematic diagram of flow of laser gas estimated from the discharge state of the conventional gas laser oscillating apparatus.

Referring now to the drawings, preferred embodiments of the invention are described below. Of the structure as the AFGLO, the other parts than the laser gas lead-in part, orifice, and laser gas passage are same as shown in FIG. 37. Hence their description is omitted.

Embodiment 1

Figure 1:
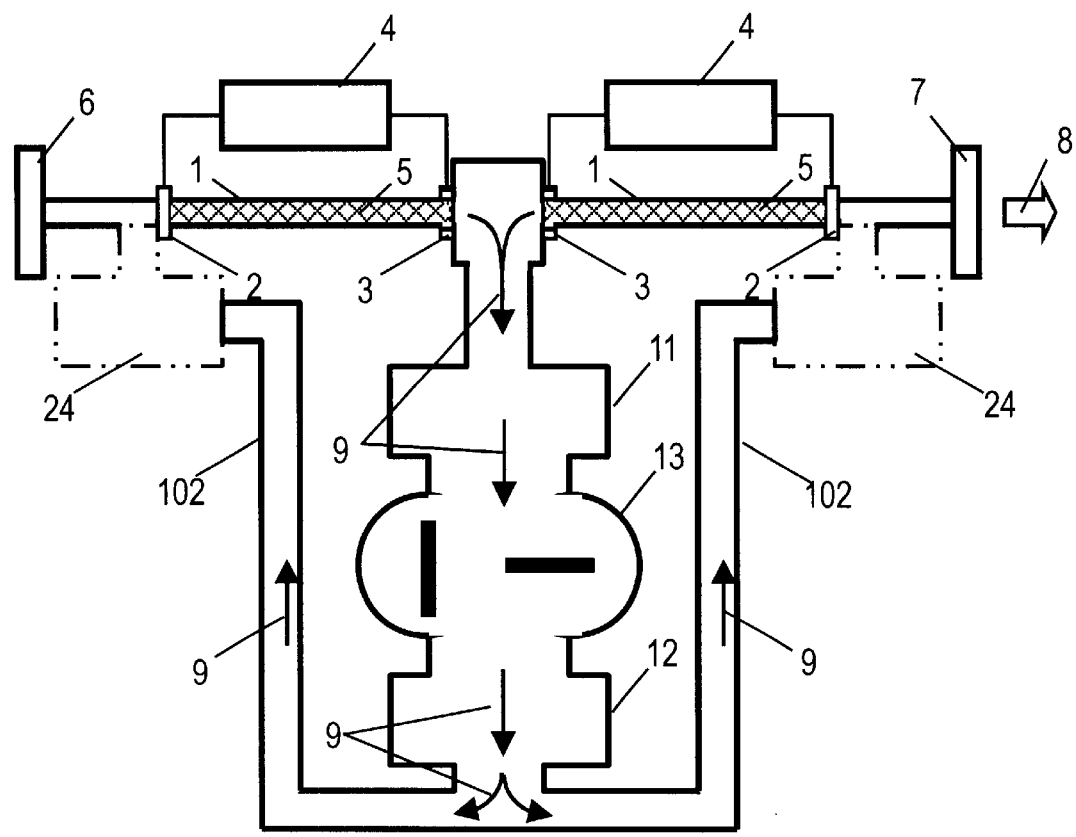
FIG. 1 shows an example of a schematic structure of AFGLO known as axial flow type in embodiment 1 of the invention.
Figure 2:
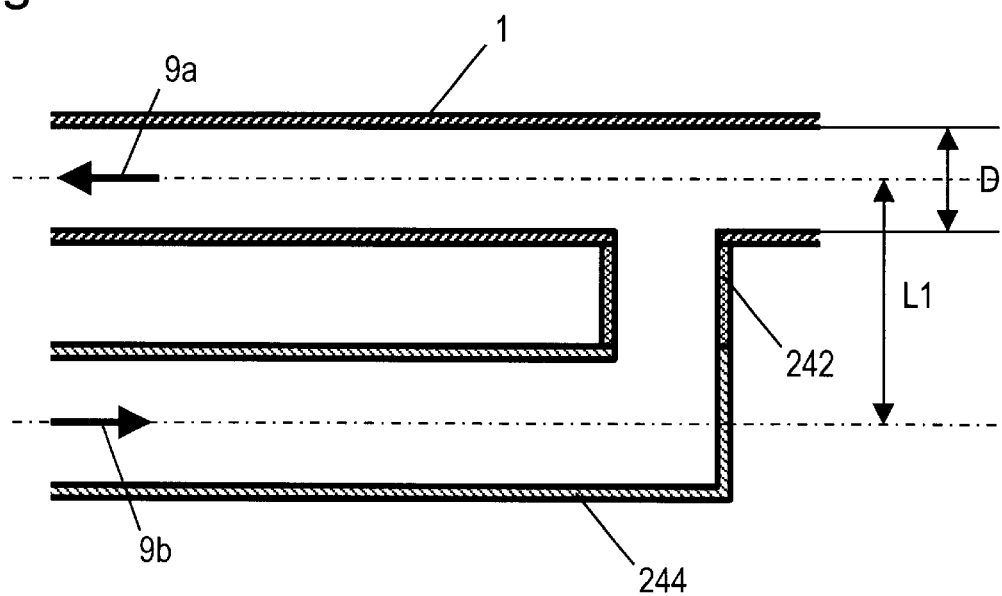
FIG. 2 is a sectional view of a DT 1 and a laser gas lead-in part 24 of the AFGLO in embodiment 1 of the invention.
Figure 3:
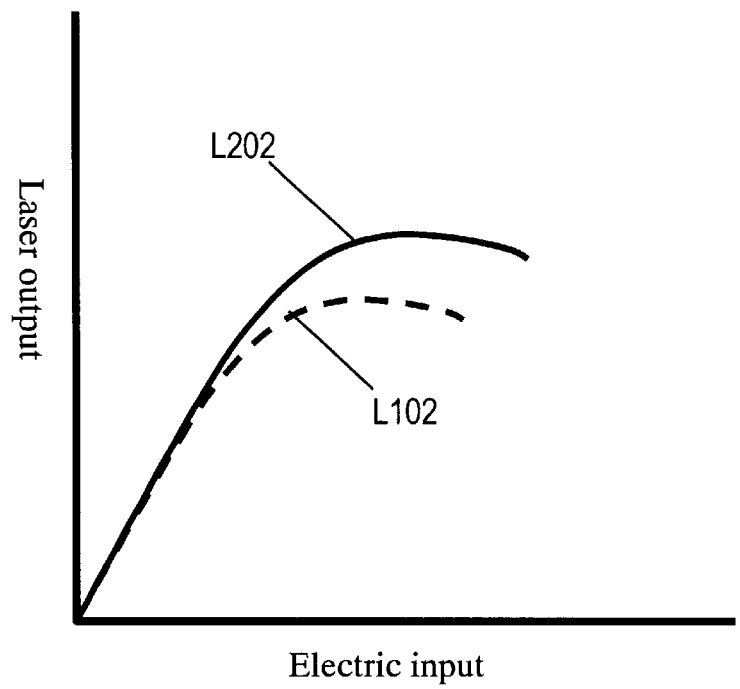
FIG. 3 is a diagram of laser output characteristic in terms of electric input to discharge tube, as compared between the embodiment and a prior art.

Embodiment 1 of the invention is explained. FIG. 1 shows an example of a schematic structure of AFGLO in embodiment 1 of the invention. FIG. 2 is a sectional view of a DT 1 and a laser gas lead-in part 24 of the AFGLO in embodiment 1 of the invention. The laser gas lead-in part 24 consists of a lead-in pipe 242 communicating with the DT 1, and a relay pipe 244 communicating between the lead-in pipe 242 and gas laser passage 102. The flow direction of the laser gas in the relay pipe 244 is designed to be parallel to and in reverse direction to the flowing direction of laser gas in the discharge tube. In FIG. 2, the distance L1 between the central axis of the DT 1 and the central axis of the relay pipe 244 parallel to the DT 1 is 2 to 20 times the inside diameter D of the DT 1. FIG. 3 is a diagram of laser output in terms of electric input to the discharge tube, as compared between the embodiment (L202) and a prior art (L102). In FIG. 3, the axis of abscissas denotes the discharge electric input and the axis of ordinates represents the laser output. As shown in FIG. 3, in the embodiment of the invention, the laser output is increased substantially as compared with the prior art. In this structure, the disturbance of discharge in the DA 5 is notably decreased as recognized visually.

Figure 4:
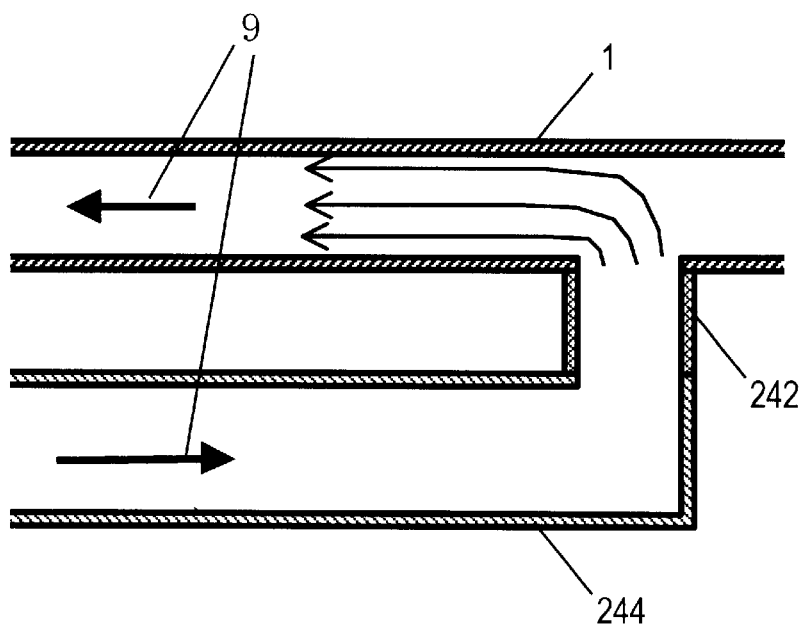
FIG. 4 is a schematic diagram of flow of laser gas.

From this discharge state, it is estimated that the laser gas is flowing as schematically shown in FIG. 4. That is, the laser gas flowing in the relay pipe 244 in the direction of arrow 9b impinges on the wall of the lead-in pipe 242, and the flow direction is inverted into the direction of arrow 9a. Later, flowing in the DT 1, a flow line having a large R from the relay pipe 244 into the DT 1 is finally formed. As a result, the laser gas flow distribution in the DT 1 is almost uniform on the whole.

Thus, the discharge state which was extremely uneven in the discharge tube in the prior art is very stable and uniform in the AFGLO in the embodiment. It is estimated from this result that the AFGLO shown in FIG. 1 having the laser gas lead-in part shown in FIG. 2 has realized a very stable and uniform laser gas flow distribution, and the laser output is increased substantially.

Figure 5:
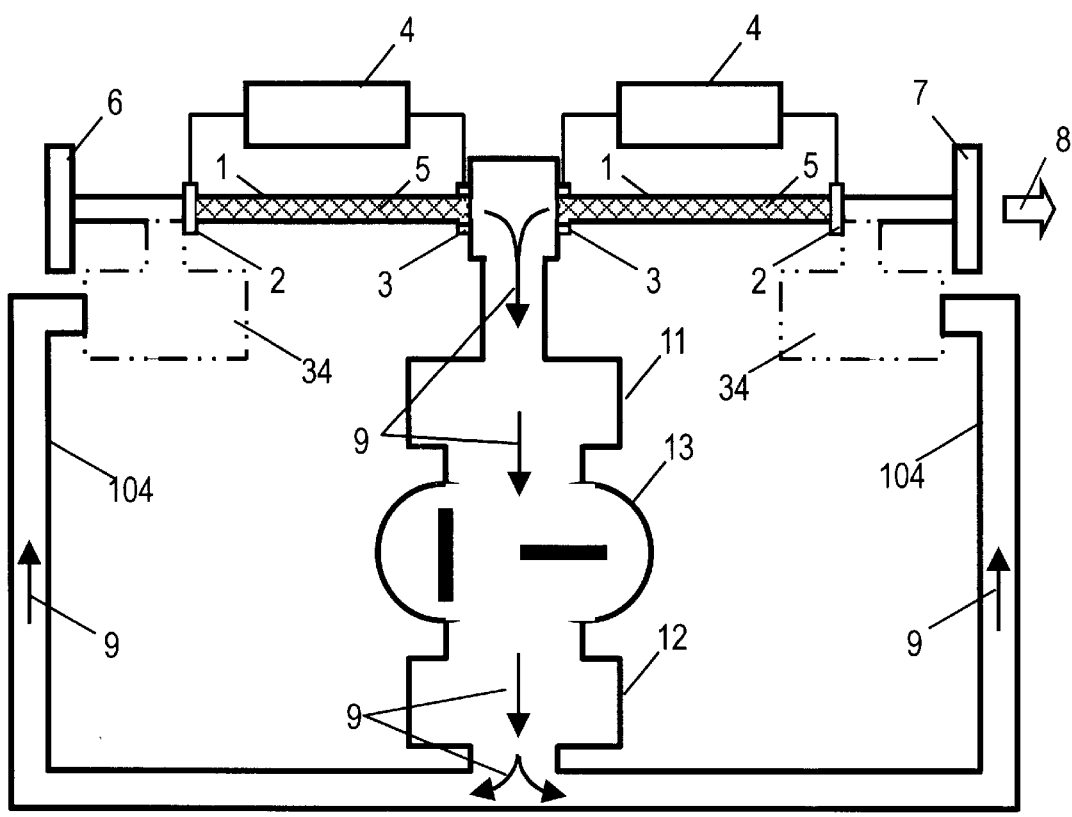
FIG. 5 is a diagram showing other structure of the AFGLO in embodiment 1.
Figure 6:
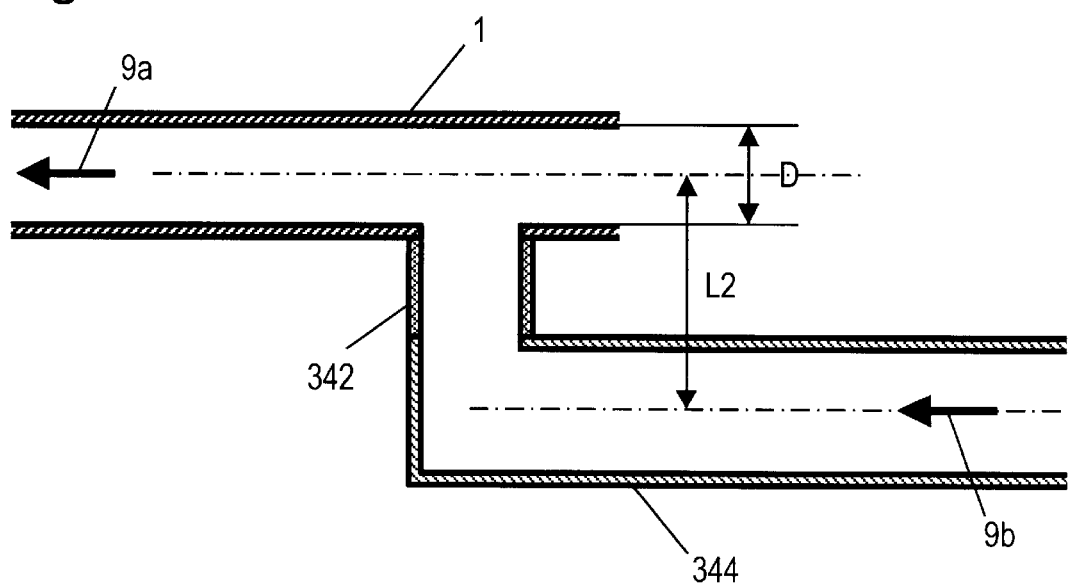
FIG. 6 is a sectional view of a laser gas lead-in part 34 of the AFGLO shown in FIG. 5.
Figure 7:
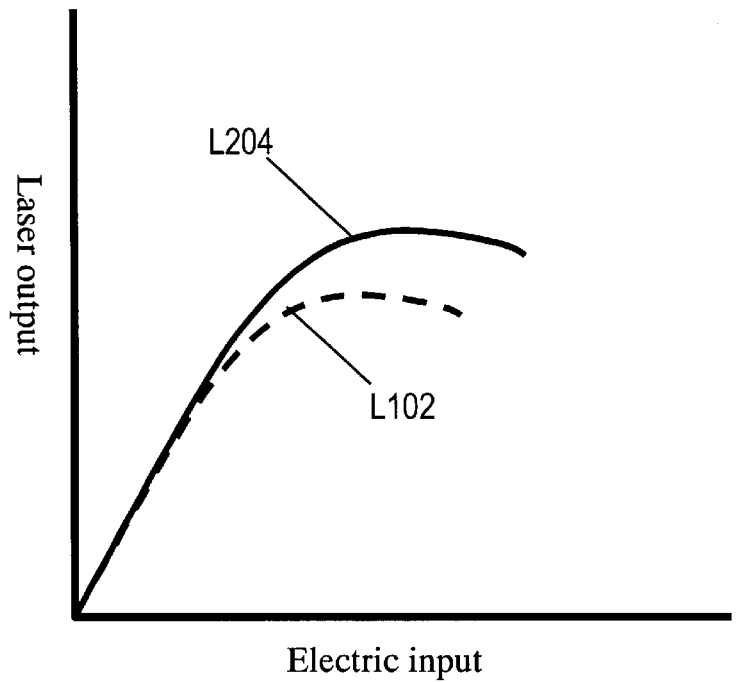
FIG. 7 is a diagram of laser output characteristic in terms of electric input to discharge tube in the AFGLO, shown in FIG. 5, as compared with the prior art.

FIG. 5 is a diagram showing other structure of the AFGLO in embodiment 1. FIG. 6 is a sectional schematic view of a laser gas lead-in part 34 of the AFGLO shown in FIG. 5. The flow direction of laser gas in the relay pipe 344 is designed to be parallel to and in the same direction as the flow direction of laser gas in the discharge tube. In FIG. 6, the distance L2 between the central axis of the DT 1 and the central axis of the relay pipe 344 parallel to the DT 1 is 2 to 20 times the inside diameter D of the DT 1. FIG. 7 is a diagram of laser output (L204) in terms of electric input to the discharge tube, as compared with the prior art (L102). In FIG. 7, the axis of abscissas denotes the discharge electric input and the axis of ordinates represents the laser output. As shown in FIG. 7, in the embodiment of the invention, the laser output is increased substantially as compared with the prior art. In this structure, the disturbance of discharge in the DA 5 is notably decreased as recognized visually. The output characteristic of this structure shown in FIG. 7 is almost same as the output characteristic shown in FIG. 3.

Figure 8:
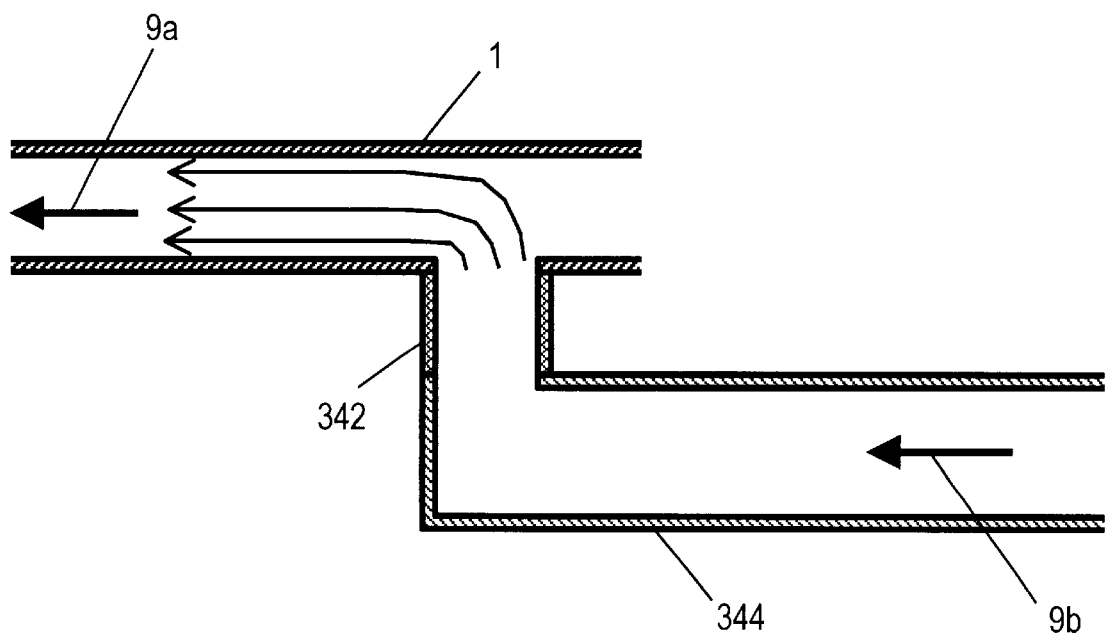
FIG. 8 is a schematic diagram of flow of laser gas.

From this discharge state, it is estimated that the laser gas is flowing as schematically shown in FIG. 8. That is, the laser gas flowing in the relay pipe 344 in the direction of arrow 9b smoothly passes through the lead-in pipe 342. In this structure, a smooth flow line is formed from the relay pipe 344 into the DT 1. As a result, the laser gas flow distribution in the DT 1 is almost uniform on the whole.

Thus, the discharge state which was extremely uneven in the discharge tube in the prior art is very stable and uniform in the AFGLO in the embodiment. It is estimated from this result that the AFGLO shown in FIG. 5 having the laser gas lead-in part shown in FIG. 6 has realized a very stable and uniform laser gas flow distribution, and the laser output is increased substantially.

Figure 9:
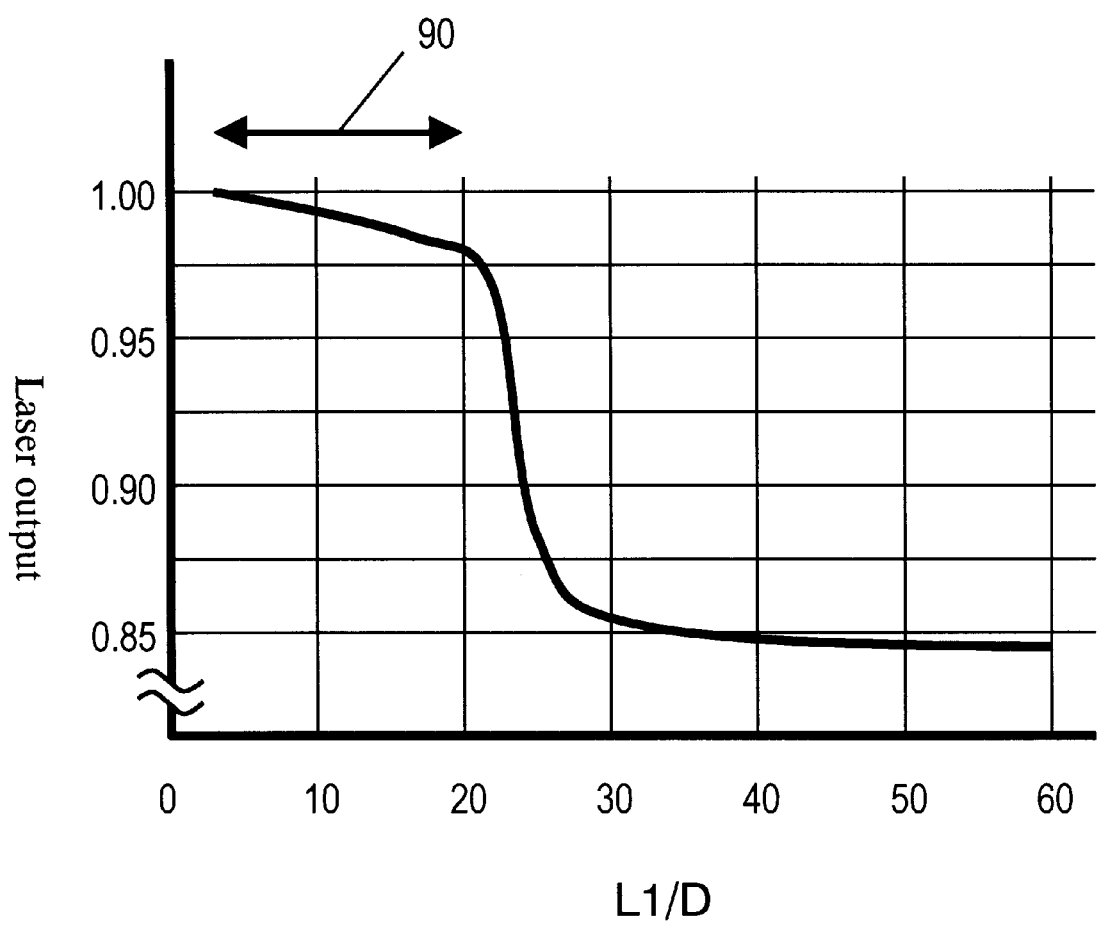
FIG. 9 is a diagram showing the degree of effect of distance L1 between central axis of DT 1 and central axis of relay pipe 244 parallel to the DT 1 and the inside diameter D of the DT 1, on the laser output.

FIG. 9 is a diagram showing the degree of effect of distance L1 between central axis of DT 1 and central axis of relay pipe 244 parallel to the DT 1 and the inside diameter D of the DT 1, on the laser output. In FIG. 9, the axis of abscissas denotes the ratio L1/D, and the axis of ordinates represents the laser output. As shown in FIG. 9, there is an appropriate value for L1/D. That is, the range indicated by arrow 90 in FIG. 9 shows an appropriate value. The range of L1/D is 2 to 20.

Figure 10:
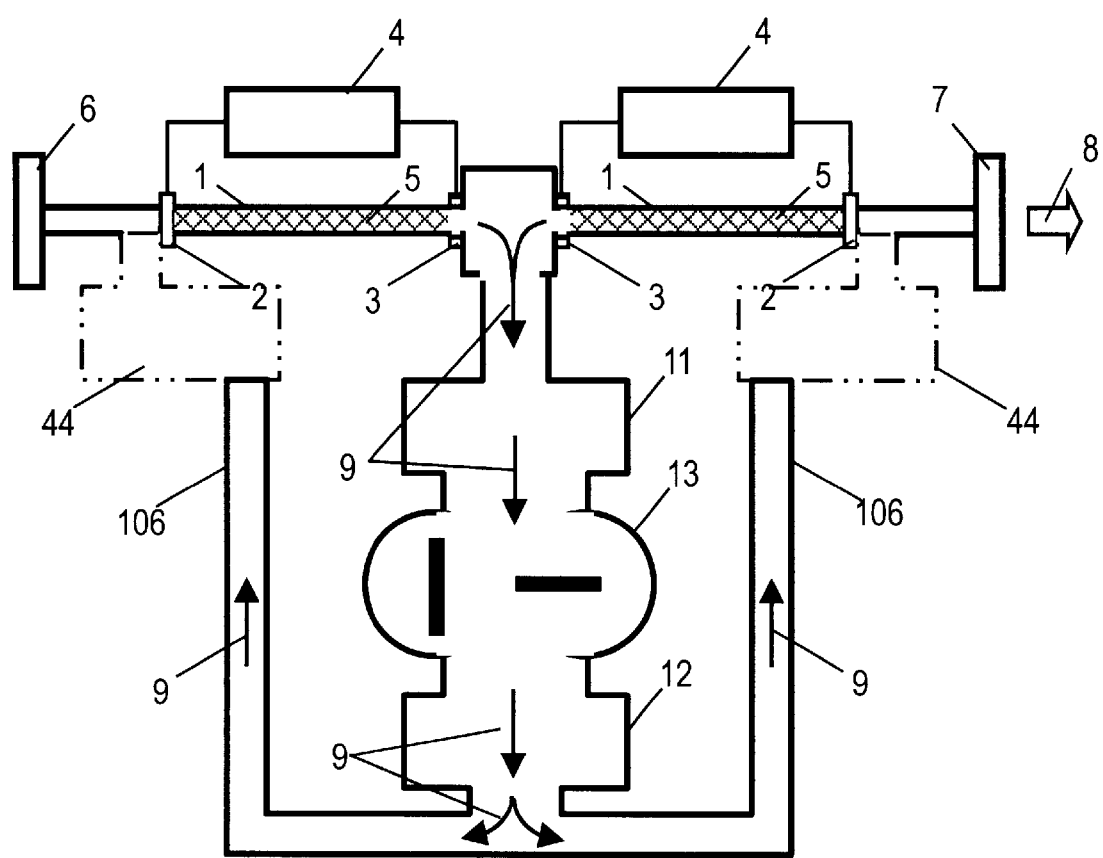
FIG. 10 is a diagram showing a different structure of the AFGLO in embodiment 1.
Figure 11:
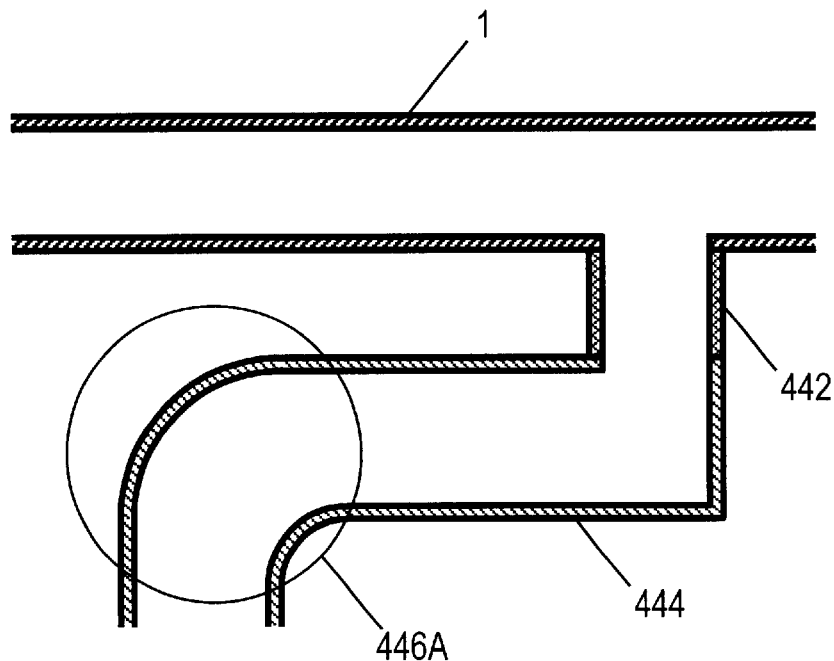
FIG. 11 is a sectional view of a laser gas lead-in part 44 of the AFGLO shown in FIG. 10.
Figure 12:
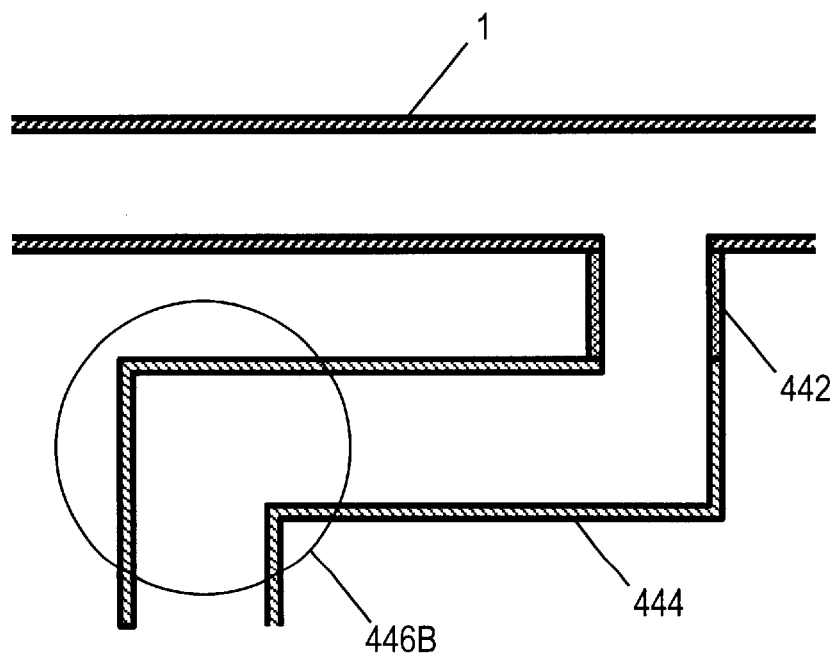
FIG. 12 is a sectional view of other structure of the laser gas lead-in part 44 of the AFGLO shown in FIG. 11.
Figure 13:
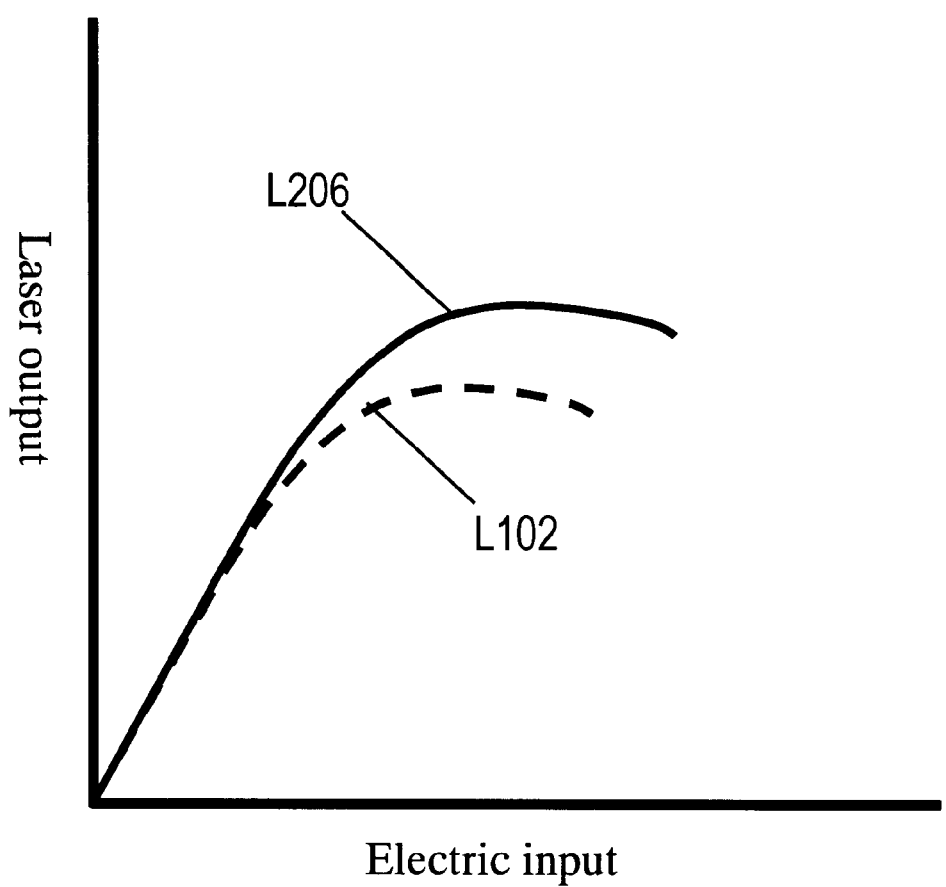
FIG. 13 is a diagram of laser output characteristic in terms of electric input to discharge tube of the AFGLO shown in FIG. 10 having the lead-in part 44 shown in FIG. 11, as compared with the prior art.

FIG. 10 is a diagram showing a different structure of the AFGLO in embodiment 1. FIG. 11 is a sectional schematic view of a laser gas lead-in part 44 of the AFGLO shown in FIG. 10. A curvature 446A is formed in the relay pipe 444. The flow direction of laser gas in the relay pipe 444 passes through the curvature 446A from the laser gas passage 106, and is parallel to and in the reverse direction to the flow direction of laser gas in the discharge tube. FIG. 13 is a diagram of laser output (L206) in terms of electric input to the discharge tube of the AFGLO shown in FIG. 10 having the lead-in part 44 shown in FIG. 11, as compared with the prior art (L102). In FIG. 13, the axis of abscissas denotes the discharge electric input and the axis of ordinates represents the laser output. As shown in FIG. 13, in the laser gas lead-in part 44 shown in FIG. 11, the laser output is increased substantially as compared with the prior art. In this structure, the disturbance of discharge in the DA 5 is notably decreased as recognized visually. The output characteristic shown in FIG. 13 is almost same as the output characteristic shown in FIG. 3. Further, in the AFGLO shown in FIG. 10 having the laser gas lead-in part shown in FIG. 12, the discharge state and laser output characteristic are almost same as those of the AFGLO shown in FIG. 10 having the lead-in part 44 shown in FIG. 11.

Figure 14:
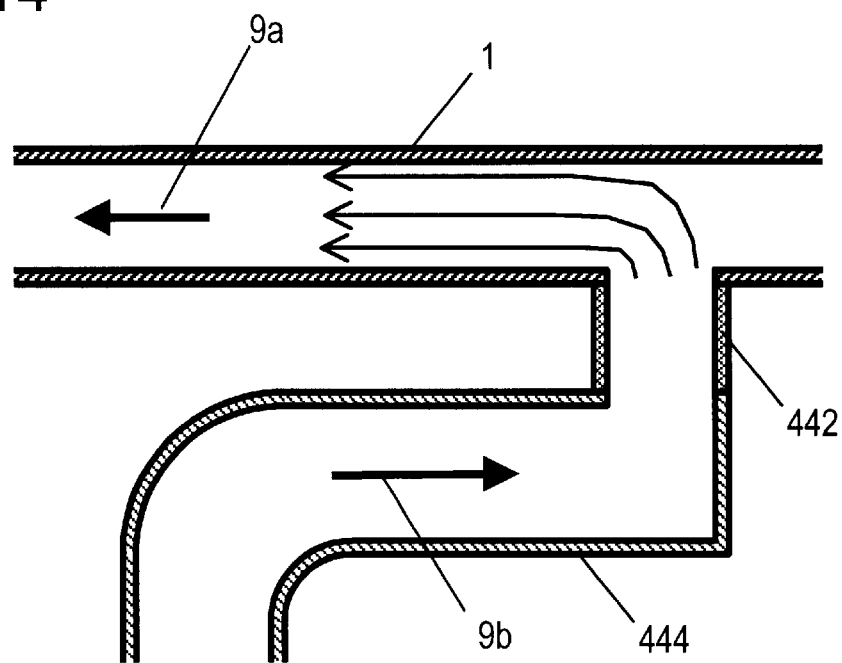
FIG. 14 is a schematic diagram of flow of laser gas in discharge tube of the AFGLO shown in FIG. 10 having the lead-in part 44 shown in FIG. 11.
Figure 15:
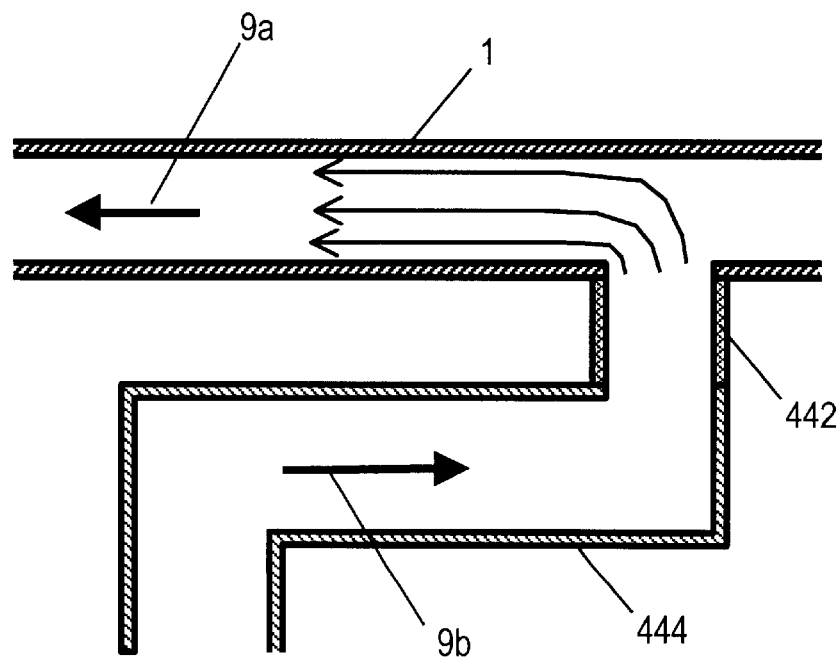
FIG. 15 is a schematic diagram of flow of laser gas in discharge tube of the AFGLO shown in FIG. 10 having the lead-in part 44 shown in FIG. 12.

From this discharge state, it is estimated that the laser gas is flowing as schematically shown in FIG. 14 and FIG. 15.

Embodiment 2

Figure 16:
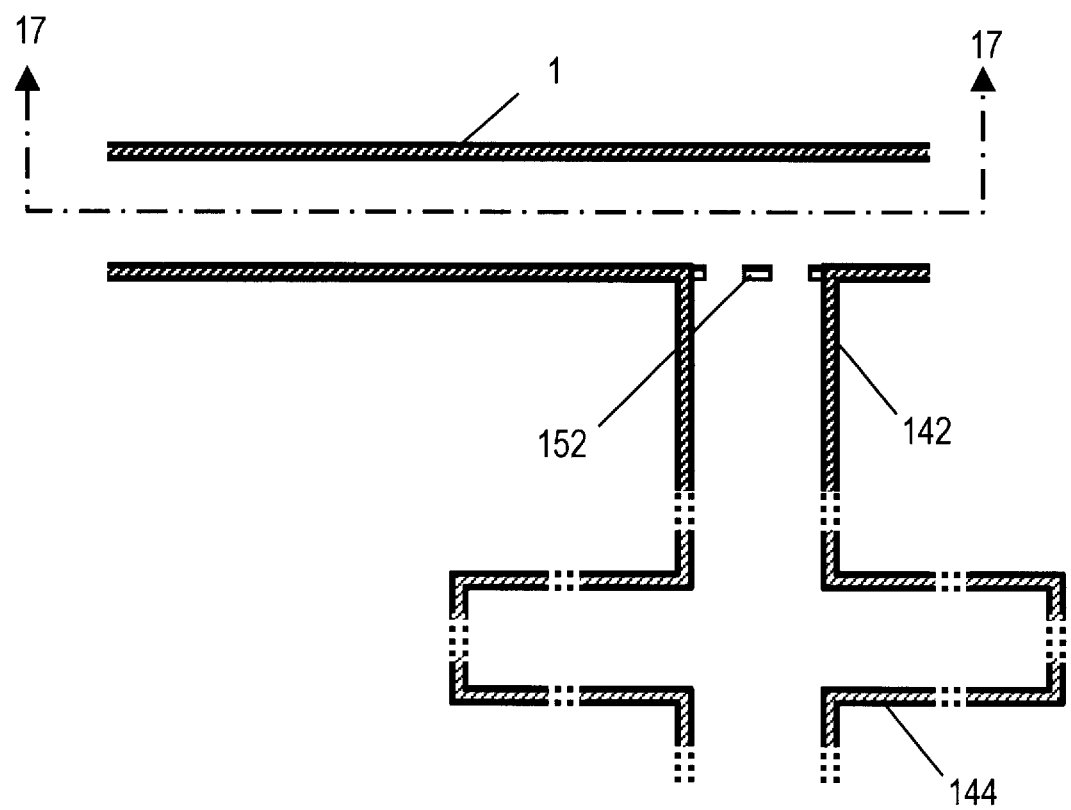
FIG. 16 is a partial sectional view of laser gas lead-in part 14 having an orifice and DT 1.
Figure 17:
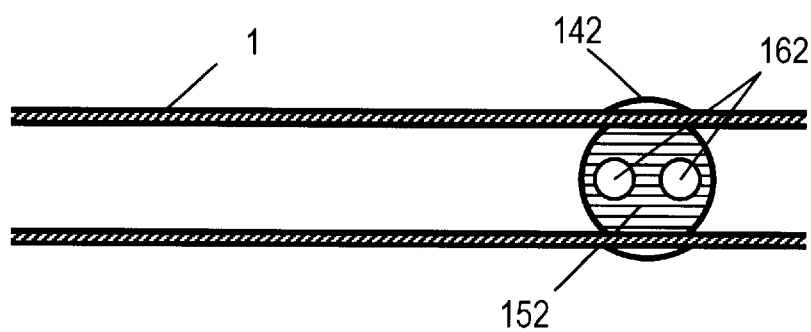
FIG. 17 is a sectional view along line 17—17 shown in FIG. 16.
Figure 42:
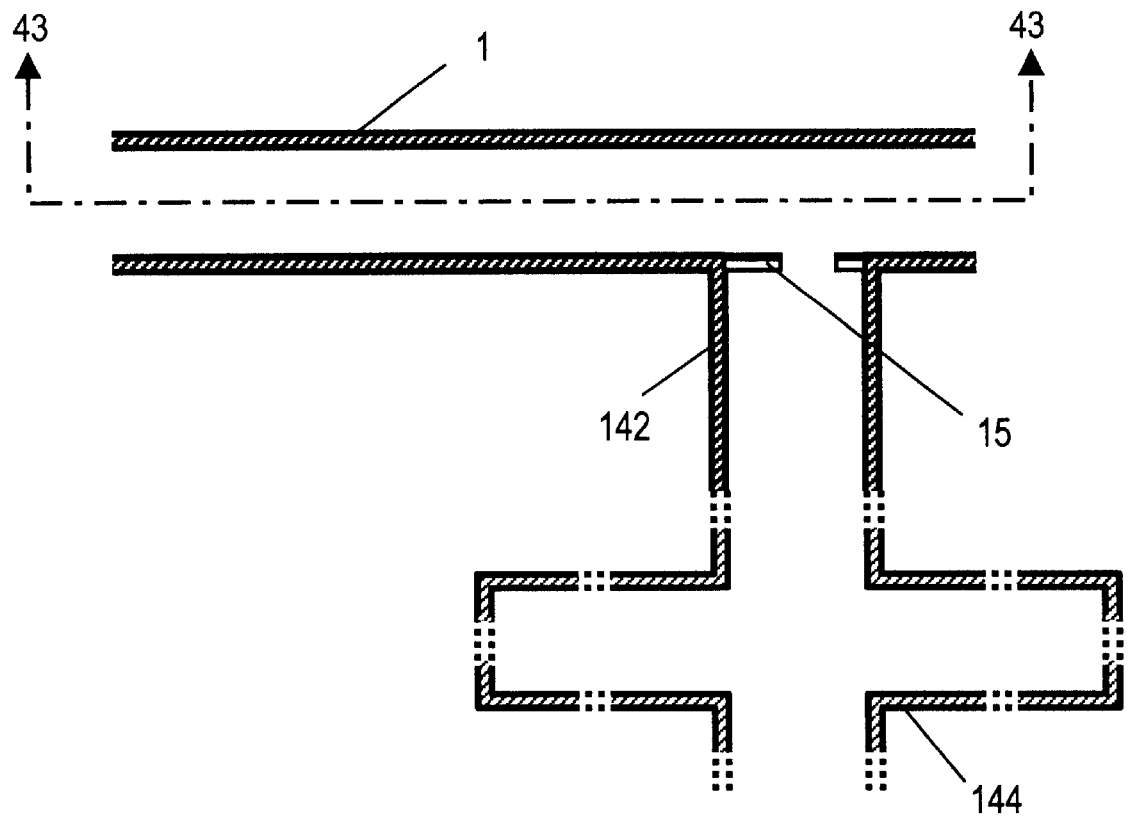
FIG. 42 is a partial sectional view of lead-in part 14 having an orifice and DT 1 of the conventional gas laser oscillating apparatus.
Figure 43:
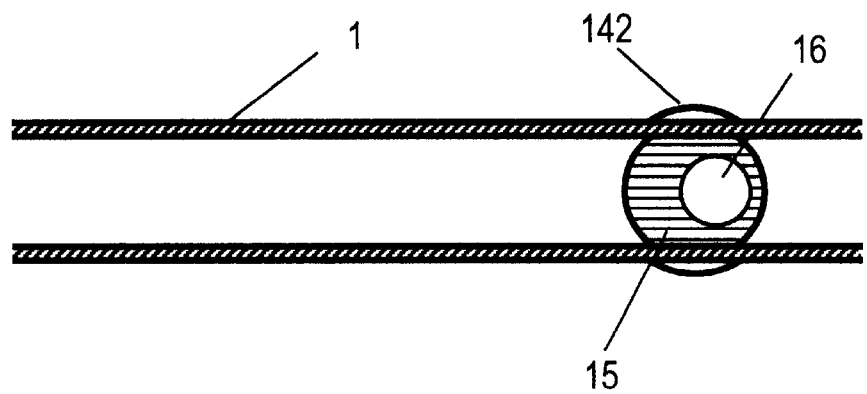
FIG. 43 is a sectional view along line 43—43 shown in FIG. 42.
Figure 44:
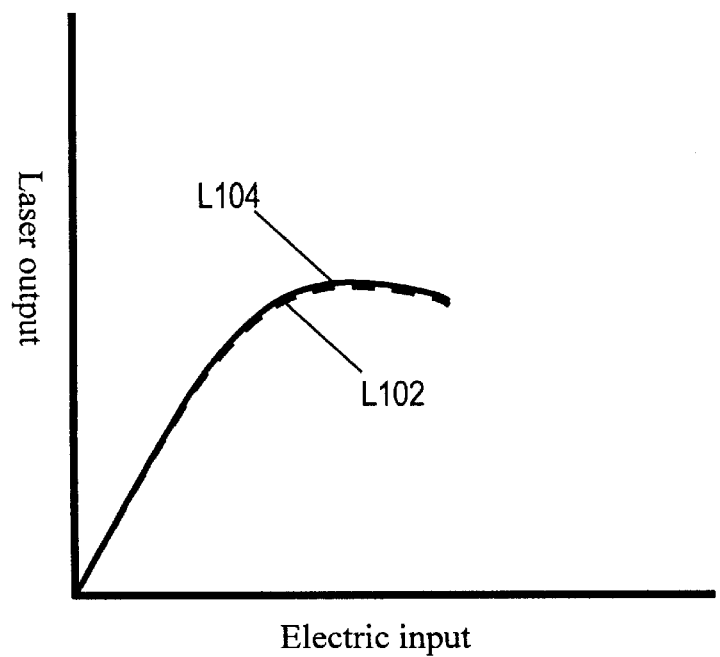
FIG. 44 shows the laser output in terms of electric input to discharge tube in the conventional gas laser oscillating apparatus shown in FIG. 42.
Figure 45:
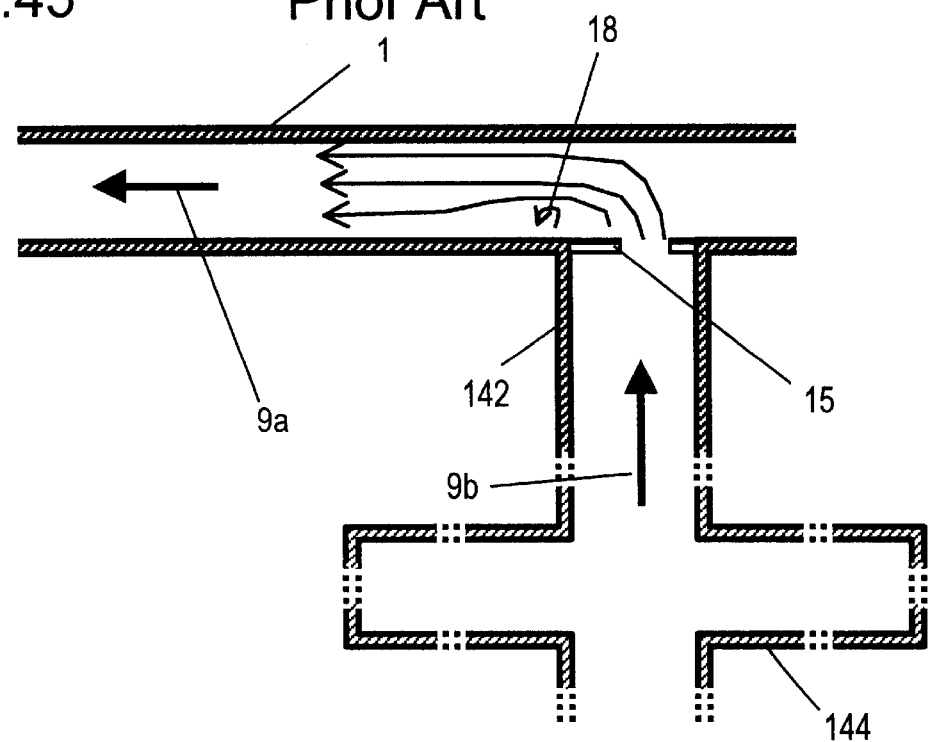
FIG. 45 is a schematic diagram of flow of laser gas estimated from the discharge state of the conventional gas laser oscillating apparatus shown in FIG. 42.

Embodiment 2 of the invention is explained below by referring to the drawings. Of the structure as the AFGLO in embodiment 2, the other parts than the shape of the orifice of the laser gas lead-in part are same as shown in FIG. 37, FIG. 42 and FIG. 43. Hence their description is omitted. FIG. 16 is a partial sectional view of lead-in part 14 having an orifice and DT 1. FIG. 17 is a sectional view along line 17—17 shown in FIG. 16.

Figure 18:
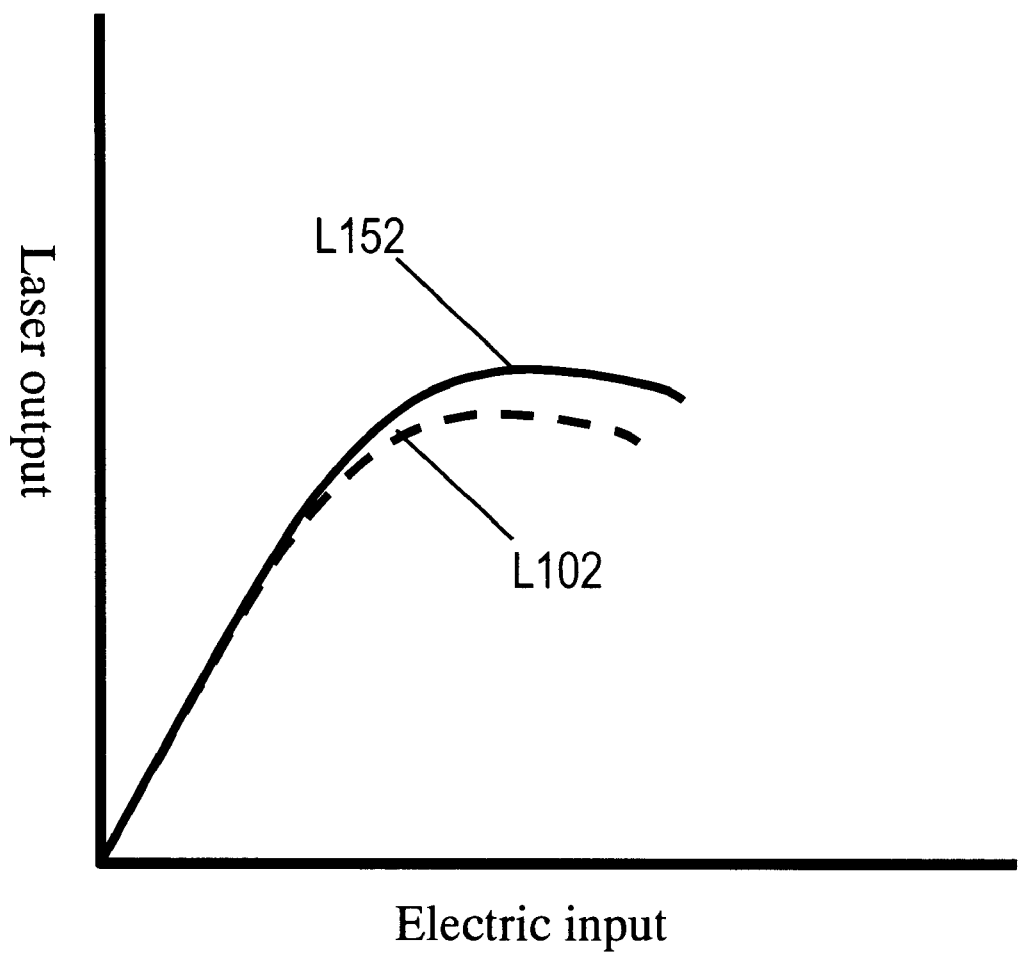
FIG. 18 is a diagram of laser output characteristic in terms of electric input to discharge tube of an AFGLO in embodiment 2, as compared with the prior art.

As shown in FIG. 16 and FIG. 17, an orifice 152 is disposed between the DT 1 and lead-in pipe 142. The orifice 152 includes a portion for impeding the flow of laser gas, and two holes 162 for passing laser gas. The two holes of the orifice 152 are disposed at positions deviated from the center of the orifice 152, parallel to the flow direction of laser gas. In this configuration, the laser gas flows out from the lead-in pipe 142, passes through the two holes 162 of the orifice 152, and runs into the DT 1. The discharge state in the DA 5 in this structure is less in disturbance and stable as compared with the discharge state of the AFGLO of the conventional structure. FIG. 18 is a diagram of laser output characteristic (L152) of this structure, as compared with the conventional AFGLO same as in FIG. 3. As shown in FIG. 18, in the laser gas lead-in part having the orifice 152 as shown in FIG. 16 and FIG. 17, the laser output is increased substantially as compared with the prior art.

From the discharge state of this structure, it is estimated that the laser gas is flowing as follows. That is, the flow lines of the laser gas passing through the two holes 162 of the orifice 152 converge so as to compensate for each unevenness. As a result, a uniform gas flow distribution is obtained in the discharge tube.

Figure 19:
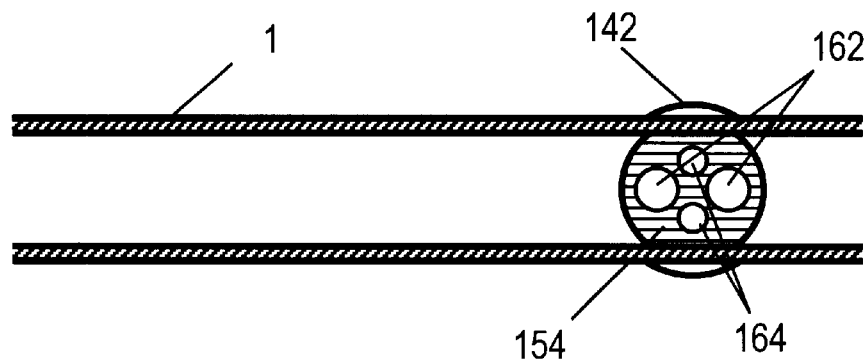
FIG. 19 is a diagram showing the shape of an orifice having four holes.

FIG. 19 shows other shape of the orifice shown in FIG. 16. As shown in FIG. 19, in addition to the structure of the orifice shown in FIG. 16, two holes 164 are disposed in the orifice 154 in a vertical direction to the flow direction of laser gas. Herein, a total of four holes are formed in the orifice 154.

Figure 20:
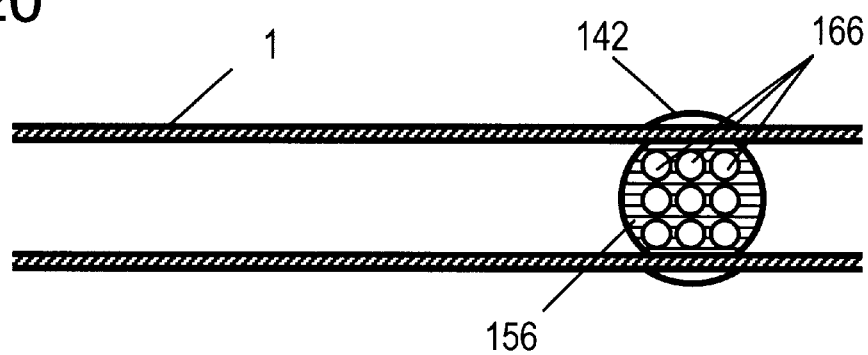
FIG. 20 is a diagram showing the shape of an orifice having nine holes.

FIG. 20 shows a different shape of the orifice shown in FIG. 16. As shown in FIG. 20, as compared with the structure of the orifice shown in FIG. 16, more holes 166 are disposed in the orifice 156. Herein, a total of nine holes are formed in the orifice 156.

Figure 21:
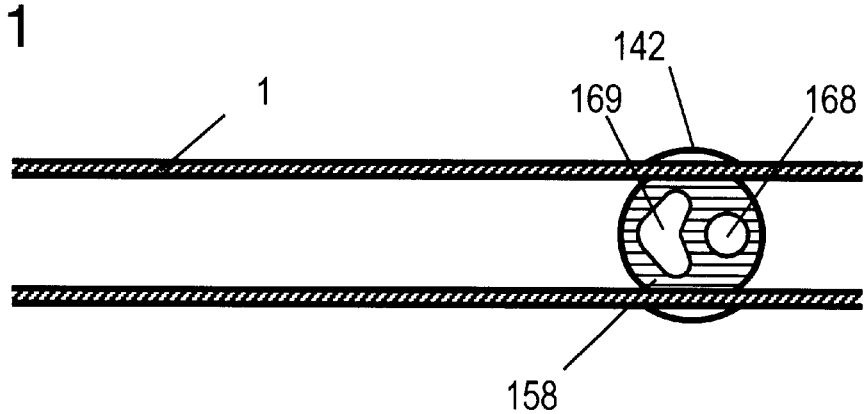
FIG. 21 is a diagram showing an example of two holes, forming a smaller hole 168 at the upstream side of the laser gas flow as seen from the DT 1 side, and a larger hole 169 at the downstream side.

Further, FIG. 21 shows other different shape of the orifice shown in FIG. 16. As shown in FIG. 21, the structure of the orifice shown in FIG. 16 is modified. That is, of the two holes on the orifice 158, a hole 168 at the upstream side of the laser gas flow as seen from the DT 1 side is smaller, and a hole 169 at the downstream side is larger.

Figure 22:
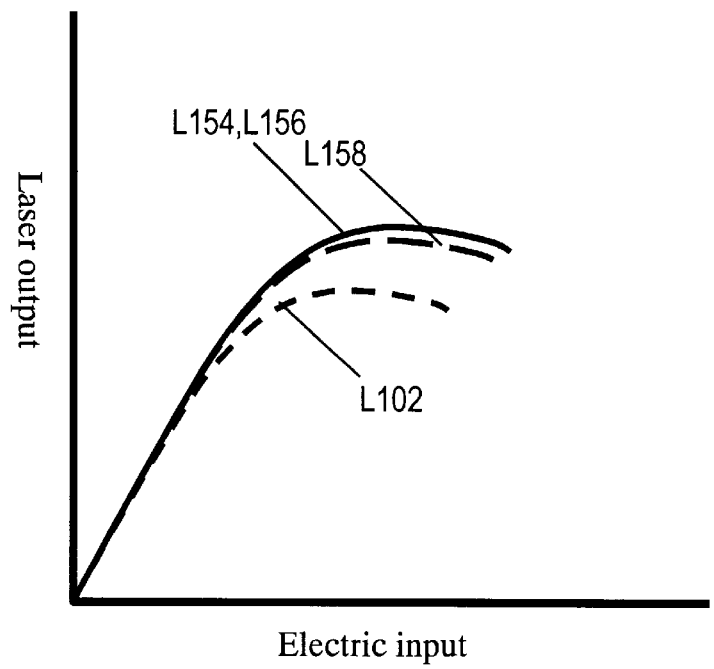
FIG. 22 is a diagram of laser output characteristic of the AFGLO having an orifice in the shape shown in FIG. 19, 20 or 21.

In the AFGLO having the orifice in the shape as shown in FIG. 19, 20, or 21 disposed near the boundary of the lead-in pipe 142 and DT 1, the laser gas flows from the lead-in pipe 142, passes through the plural holes opened in the orifice, and runs into the DT 1. In the orifice of any shape shown in FIG. 19, 20, or 21, the discharge state in the DA 5 is less in disturbance and stable as compared with the discharge state in the conventional AFGLO. FIG. 22 is a diagram of laser output characteristic of the AFGLO having an orifice in the shape shown in FIG. 19, 20 or 21, as compared with the conventional AFGLO same as in FIG. 3. In FIG. 22, L154 shows the output characteristic of the AFGLO having the orifice 154 shown in FIG. 19. In FIG. 22, L156 shows the output characteristic of the AFGLO having the orifice 156 shown in FIG. 20. In FIG. 22, L158 shows the output characteristic of the AFGLO having the orifice 158 shown in FIG. 21. As shown in FIG. 22, in the laser gas lead-in part having the orifice shown in FIG. 19, 20, or 21, the laser output is increased substantially as compared with the prior art.

Figure 23:
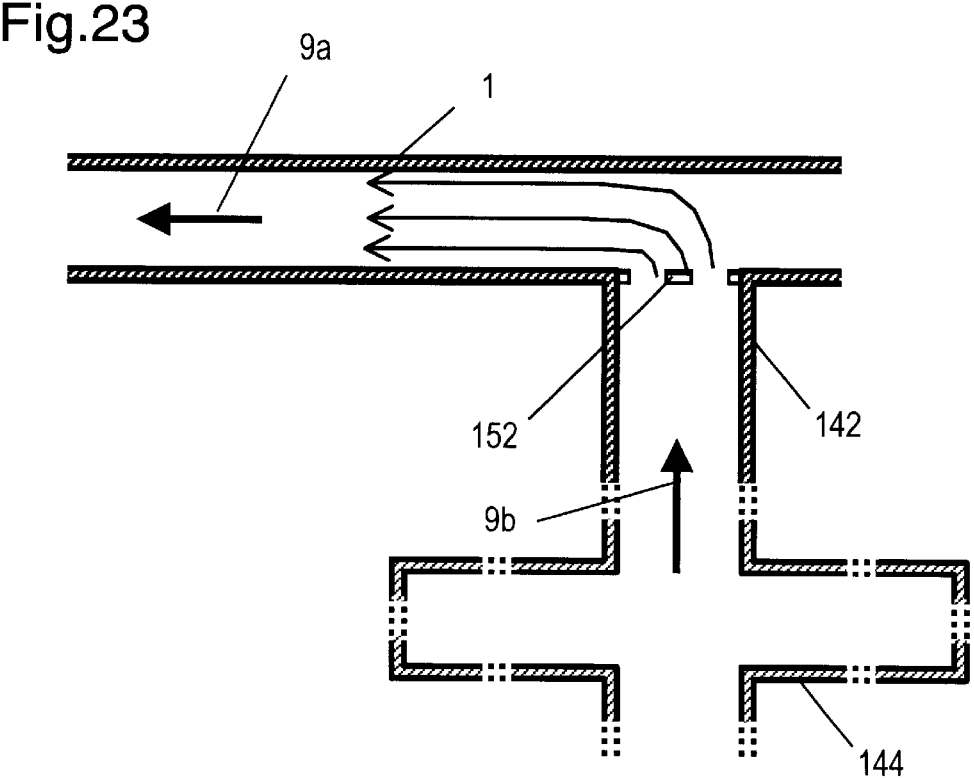
FIG. 23 is a schematic diagram of flow of laser gas estimated from the discharge state of the AFGLO having an orifice 154 shown in FIG. 19.

From the discharge state of this structure, it is estimated that the laser gas is flowing as follows. That is, the flow lines of the laser gas passing through plural holes of the orifice converge so as to compensate for each unevenness. As a result, a uniform gas flow distribution is obtained in the discharge tube. FIG. 23 is a schematic diagram of flow of laser gas estimated from the discharge state of the AFGLO having an orifice 154 shown in FIG. 19.

Figure 24:
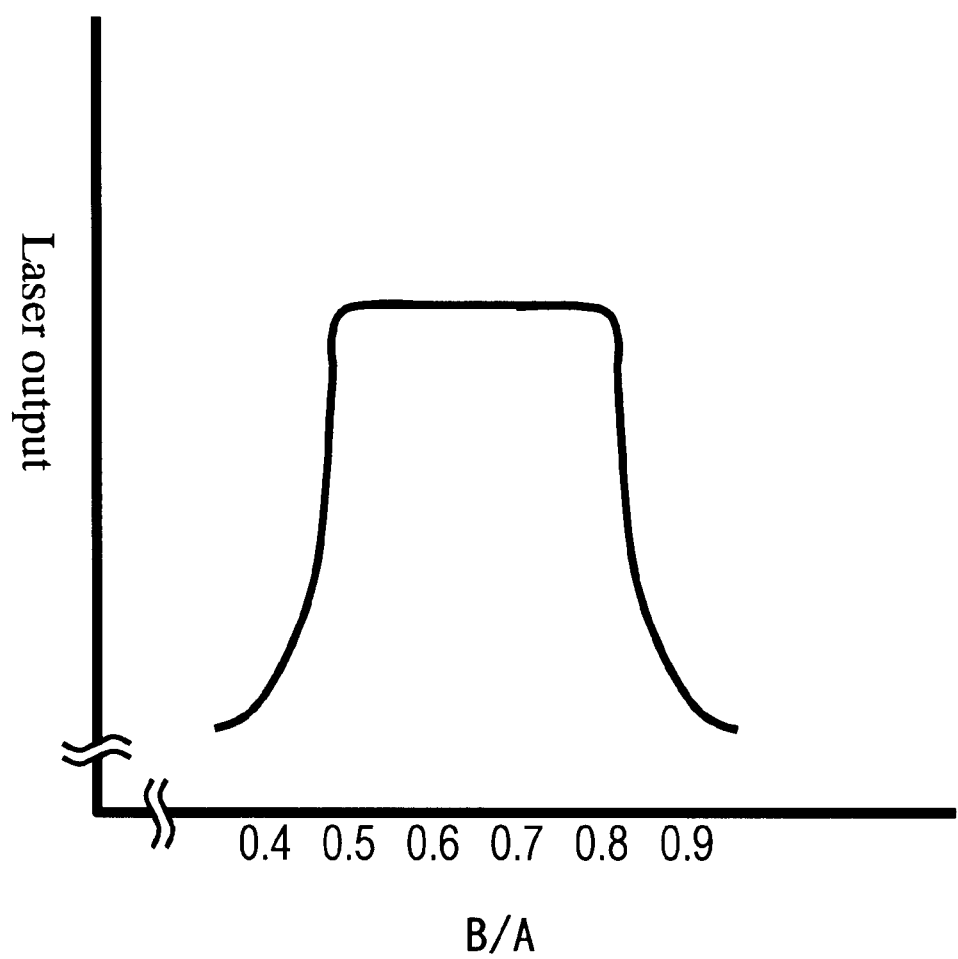
FIG. 24 is a correlation diagram of the ratio of total area of plural holes of the orifice to the sectional area of the discharge tube, and the laser output, in embodiment 2 of the invention.

FIG. 24 is a correlation diagram of the ratio of total area of plural holes of the orifice to the sectional area of the discharge tube, and the laser output, relating to embodiment 2 of the invention. Supposing the sectional area of the discharge tube to be A and the total area of plural holes provided in the orifice to be B, in a range of B/A from 0.5 to 0.8, a stable gas flow is obtained. By this stable gas flow, a favorable discharge is realized. A favorable discharge causes to increase the laser output. Going out of this range, the gas flow is unstable, and the discharge state becomes poor, and hence the laser output drops. It is therefore known that an appropriate range of B/A is from 0.5 to 0.8.

Further, as a result of investigations by the present inventors, the gas flow tends to be stable when the holes formed in the orifice are circular, rather than square. Even in square holes, however, similar effects are obtained when the corners are formed in a large R.

In the case of forming plural circular holes, in comparison between:

a case of forming a larger hole than the radius of the orifice and other smaller holes, and a case of forming holes all smaller than the radius of the orifice, it is known that the gas flow is more stabilized in the latter case.

Embodiment 3

Figure 25:
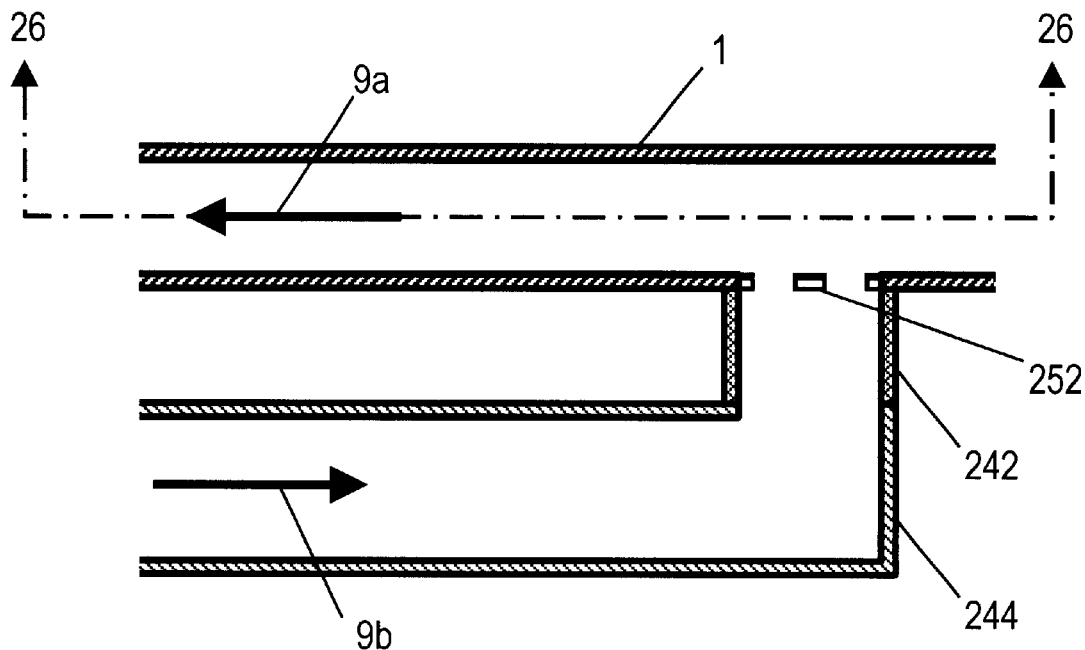
FIG. 25 is a partial sectional view of lead-in part 24 having an orifice and DT 1 in embodiment 3 of the invention.
Figure 26:
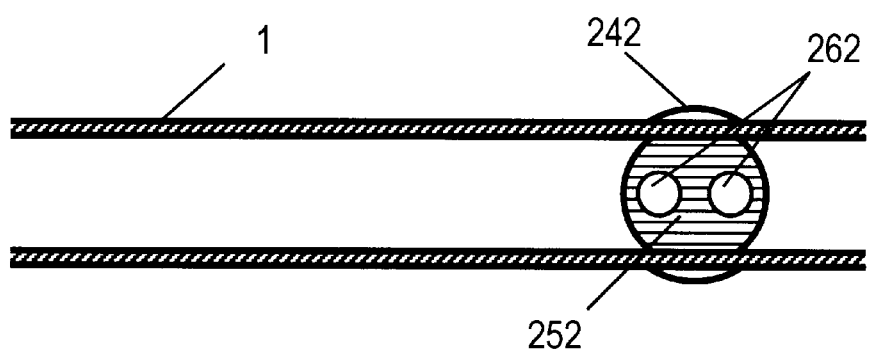
FIG. 26 is a sectional view along line 26—26 shown in FIG. 25.

Embodiment 3 of the invention is explained below by referring to the drawings. Of the structure as the AFGLO in embodiment 3, the other parts than the shape of the orifice of the laser gas lead-in part are same as shown in FIG. 1 and FIG. 2. Hence their description is omitted. FIG. 25 is a partial sectional view of lead-in part 24 having an orifice and DT 1. FIG. 26 is a sectional view along line 26—26 shown in FIG. 25.

Figure 27:
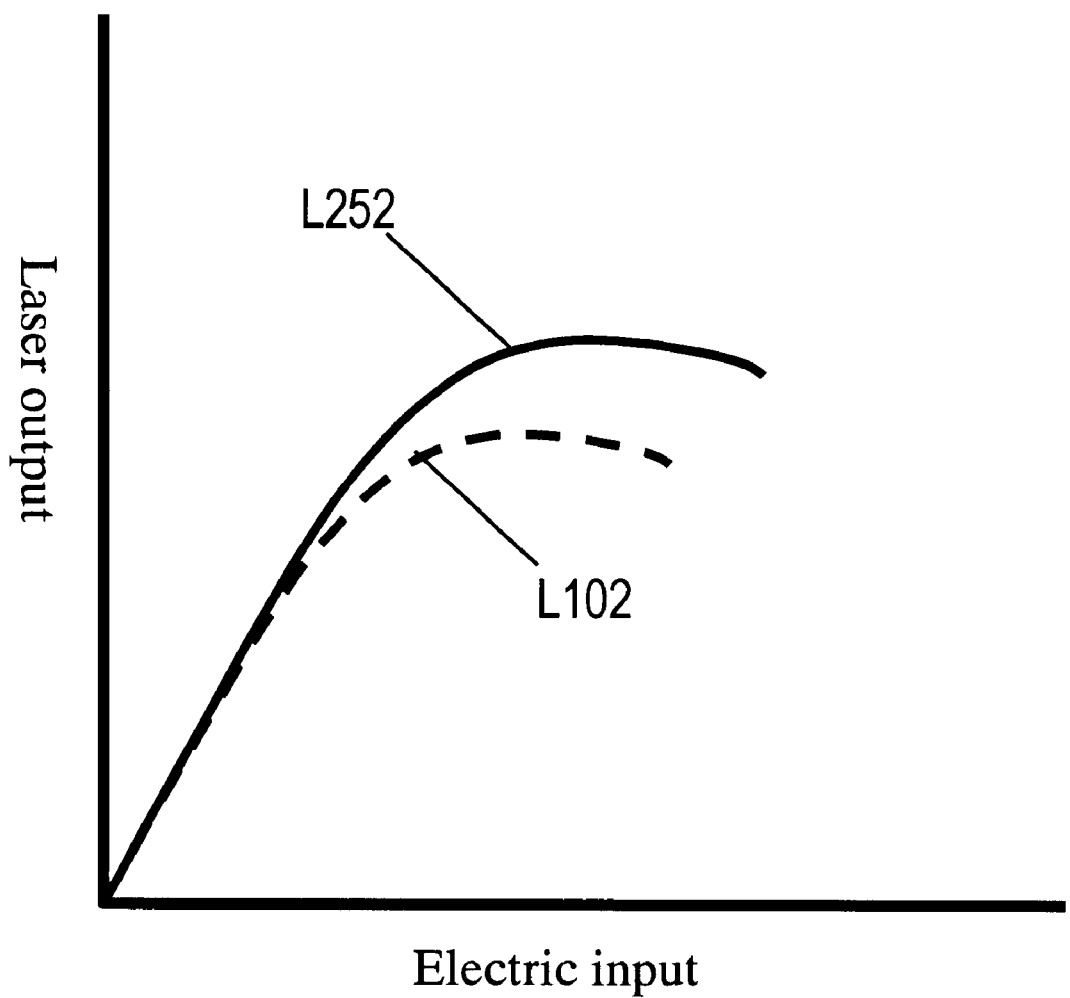
FIG. 27 is a diagram of laser output characteristic in embodiment 3 of the invention, as compared with the AFGLO of the conventional structure same as in FIG. 3.

As shown in FIG. 25 and FIG. 26, an orifice 252 is disposed between the DT 1 and lead-in pipe 242. The orifice 252 includes a portion for impeding flow of laser gas, and two holes 262 for passing laser gas. The two holes of the orifice 252 are disposed at positions deviated from the center of the orifice 252, parallel to the flow direction of laser gas. In this structure, the laser gas flows from the lead-in pipe 242, passes through the two holes 262 of the orifice 252, and runs into the DT 1. The discharge state in the DA 5 in this structure is less in disturbance and stable as compared with the discharge state of the AFGLO of the conventional structure. FIG. 27 is a diagram of laser output characteristic (L252) of this structure, as compared with the conventional AFGLO same as in FIG. 3. As shown in FIG. 27, in the AFGLO having the orifice 252 as shown in FIG. 25 and FIG. 26, the laser output is increased substantially as compared with the prior art.

From the discharge state of this structure, it is estimated that the laser gas is flowing as follows. That is, the laser gas flowing in the relay pipe 244 in the direction of arrow 9b impinges on the wall of the lead-in pipe 242, and the flow direction is inverted in the direction of arrow 9a. The gas inverted in the direction of arrow 9a flows in the DT 1, thereby forming a flow line having a large R from the lead-in pipe 242 into the DT 1. In addition, the flow lines of the laser gas passing through the two holes 262 of the orifice 252 converge so as to compensate for each unevenness. As a result, a uniform gas flow distribution is obtained in the discharge tube.

Figure 28:
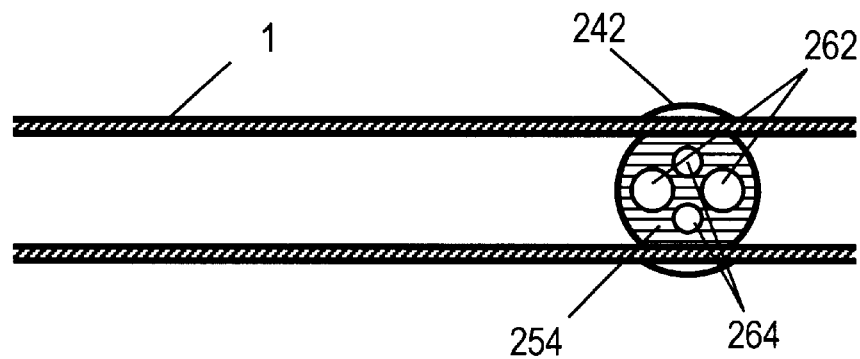
FIG. 28 is a diagram showing the shape of an orifice having four holes.

FIG. 28 shows other shape of the orifice shown in FIG. 26. As shown in FIG. 28, in addition to the structure of the orifice shown in FIG. 26, two holes 264 are disposed in the orifice 254 in a vertical direction to the flow direction of laser gas. Herein, a total of four holes are formed in the orifice 254.

Figure 29:
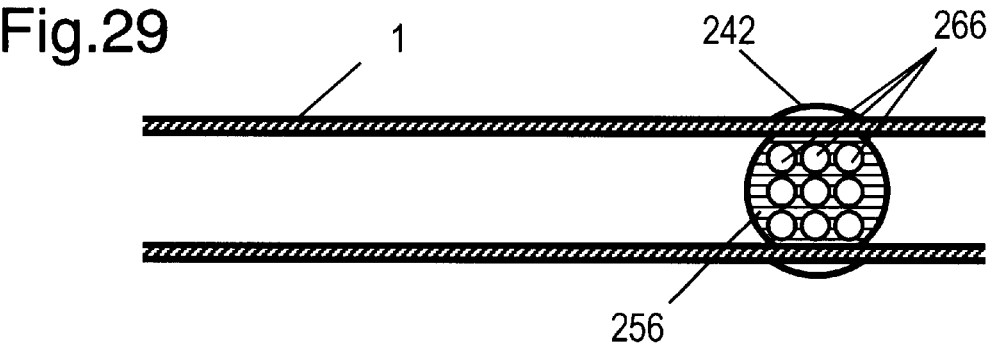
FIG. 29 is a diagram showing the shape of an orifice having nine holes.

FIG. 29 shows a different shape of the orifice shown in FIG. 26. As shown in FIG. 29, as compared with the structure of the orifice shown in FIG. 26, more holes 266 are disposed in the orifice 256. Herein, a total of nine holes are formed in the orifice 256.

Figure 30:
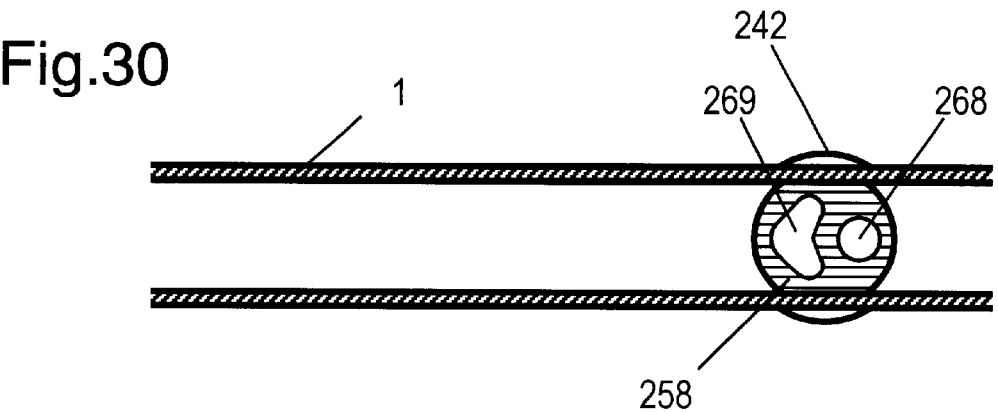
FIG. 30 is a diagram showing an example of two holes, forming a smaller hole 168 at the upstream side of the laser gas flow as seen from the DT 1 side, and a larger hole 169 at the downstream side.

Further, FIG. 30 shows other different shape of the orifice shown in FIG. 26. As shown in FIG. 30, the structure of the orifice shown in FIG. 26 is modified. That is, of the two holes on the orifice 258, a hole 268 at the upstream side of the laser gas flow as seen from the DT 1 side is smaller, and a hole 269 at the downstream side is larger.

Figure 31:
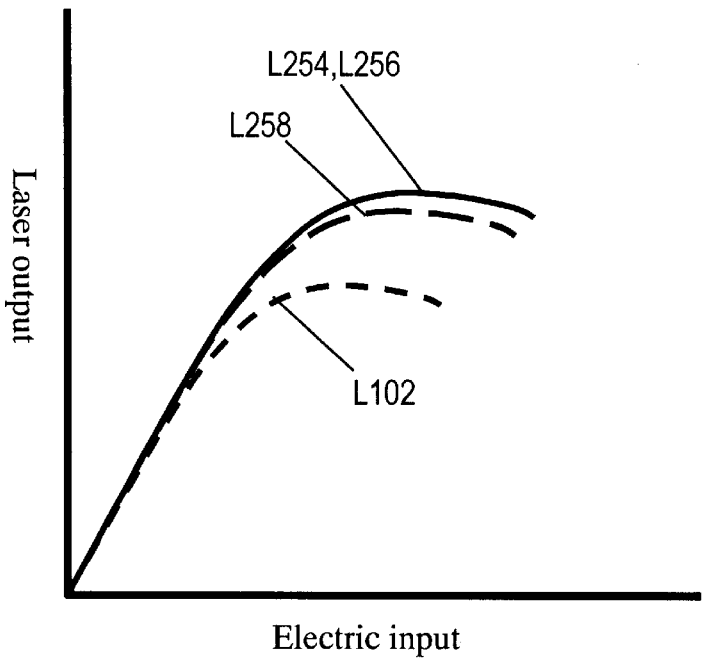
FIG. 31 is a diagram of laser output characteristic of the AFGLO having an orifice in the shape shown in FIG. 28, 29, or 30.

In the AFGLO having the orifice in the shape as shown in FIG. 28, 29, or 30 disposed near the boundary of the lead-in pipe 242 and DT 1, the laser gas flows from the lead-in pipe 242, passes through the plural holes opened in the orifice, and runs into the DT 1. In the orifice of any shape shown in FIG. 28, 29, or 30, the discharge state in the DA 5 is less in disturbance and stable as compared with the discharge state in the conventional AFGLO. FIG. 31 is a diagram of laser output characteristic of the AFGLO having an orifice in the shape shown in FIG. 28, 29, or 30, as compared with the conventional AFGLO same as in FIG. 3. In FIG. 31, L254 shows the output characteristic of the AFGLO having the orifice 254 shown in FIG. 28. In FIG. 31, L256 shows the output characteristic of the AFGLO having the orifice 256 shown in FIG. 29. In FIG. 31, L258 shows the output characteristic of the AFGLO having the orifice 258 shown in FIG. 30. As shown in FIG. 31, in the AFGLO having the orifice shown in FIG. 28, 29, or 30, the laser output is increased substantially as compared with the prior art.

Figure 32:
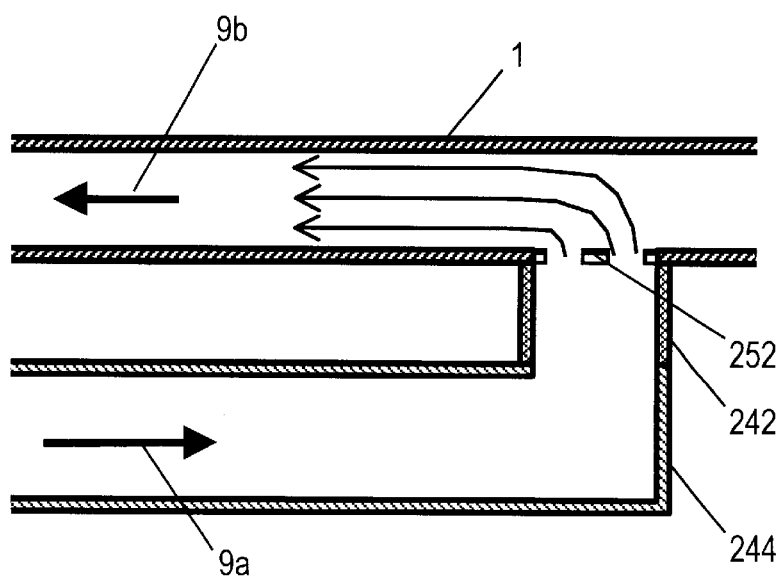
FIG. 32 is a schematic diagram of flow of laser gas estimated from the discharge state of the AFGLO having an orifice 254 shown in FIG. 28.

From the discharge state of this structure, it is estimated that the laser gas is flowing as follows. That is, the laser gas flowing in the relay pipe 244 in the direction of arrow 9b impinges on the wall of the lead-in pipe 242, and the flow direction is inverted in the direction of arrow 9a. The gas inverted in the direction of arrow 9a flows in the DT 1, thereby forming a flow line having a large R from the lead-in pipe 242 into the DT 1. In addition, the flow lines of the laser gas passing through plural holes of the orifice converge so as to compensate for each unevenness. As a result, a uniform gas flow distribution is obtained in the discharge tube. FIG. 32 is a schematic diagram of flow of laser gas estimated from the discharge state of the AFGLO having an orifice 254 shown in FIG. 28.

Figure 33:
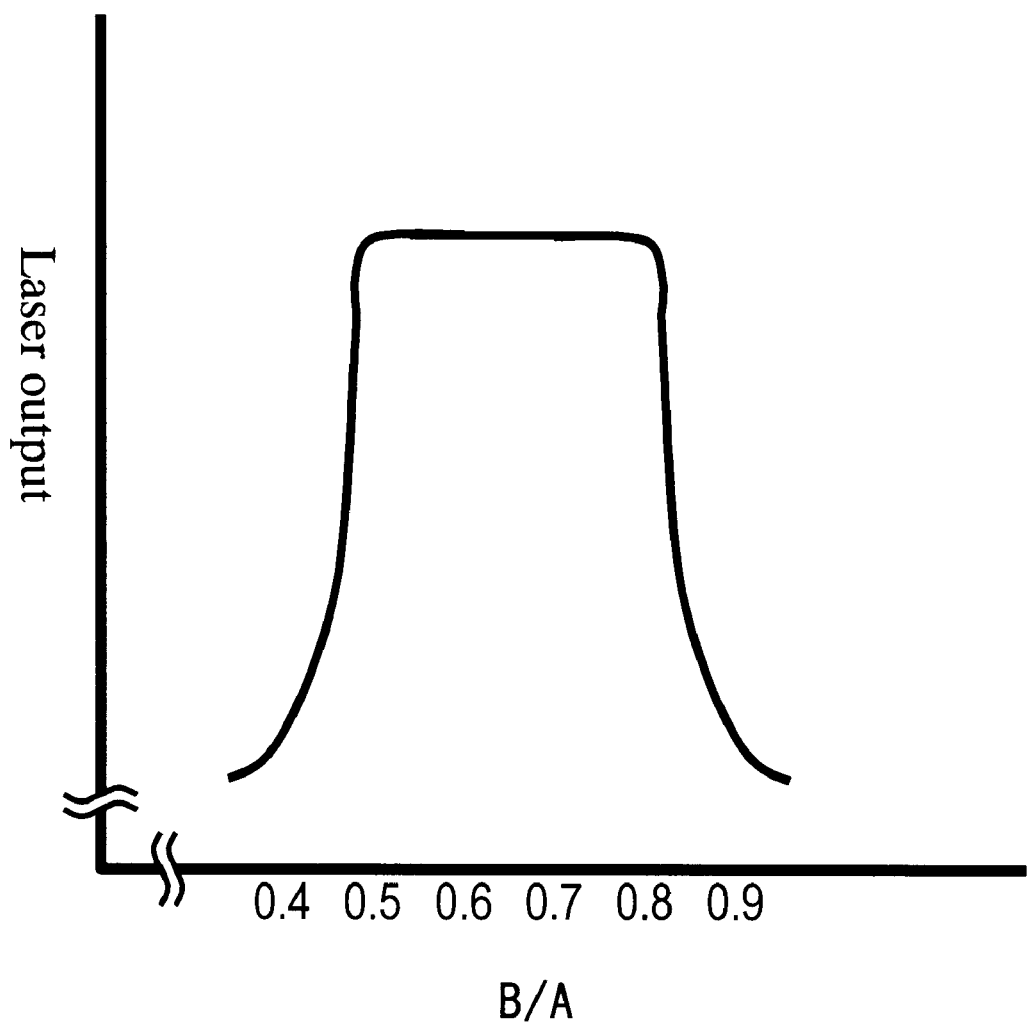
FIG. 33 is a correlation diagram of the ratio of total area of plural holes of the orifice to the sectional area of the discharge tube, and the laser output, in embodiment 3 of the invention.

FIG. 33 is a correlation diagram of the ratio of total area of plural holes of the orifice to the sectional area of the discharge tube, and the laser output, relating to embodiment 3 of the invention. Supposing the sectional area of the discharge tube to be A and the total area of plural holes provided in the orifice to be B, in a range of B/A from 0.5 to 0.8, a stable gas flow is obtained. By this stable gas flow, a favorable discharge is realized. A favorable discharge causes to increase the laser output. Going out of this range, the gas flow is unstable, and the discharge state becomes poor, and hence the laser output drops. It is therefore known that an appropriate range of B/A is from 0.5 to 0.8.

Further, as a result of investigations by the present inventors, the gas flow tends to be stable when the holes formed in the orifice are circular, rather than square. Even in square holes, however, similar effects are obtained when the corners are formed in a large R.

In the case of forming plural circular holes, in comparison between:
a case of forming a larger hole than the radius of the orifice and other smaller holes, and
a case of forming holes all smaller than the radius of the orifice, it is known that the gas flow is more stabilized in the latter case.

Figure 34:
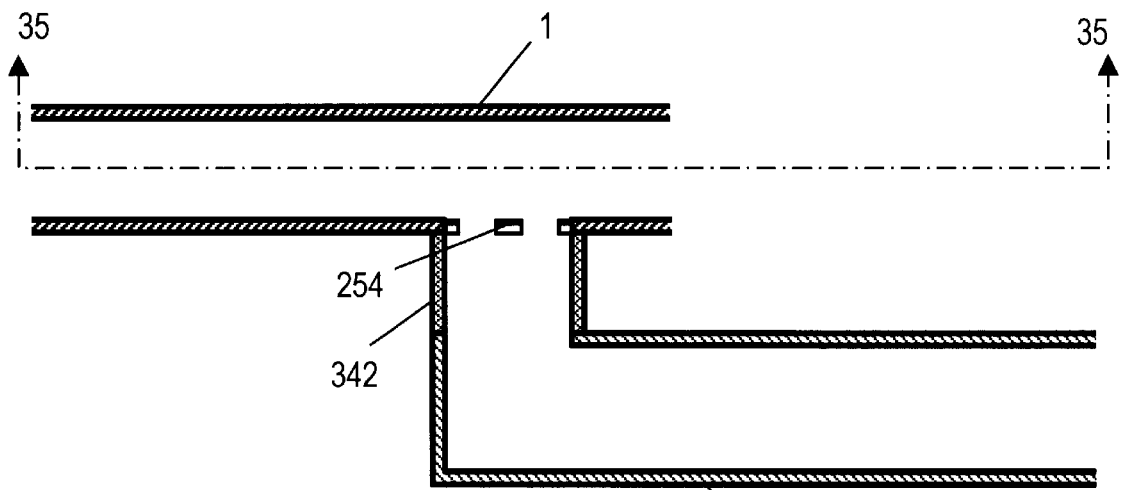
FIG. 34 is a structural diagram of AFGLO in other example of embodiment 3 of the invention.
Figure 35:
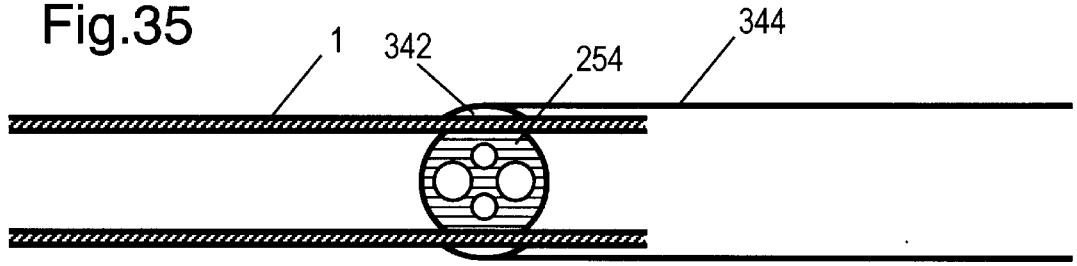
FIG. 35 is a sectional view along line 35—35 shown in FIG. 34.

FIG. 34 and FIG. 35 show structural diagrams of AFGLO in other examples of embodiment 3 of the invention. Of the structure of the AFGLO having the DT 1 and lead-in part 34 shown in FIG. 34 and FIG. 35, other parts than the shape of the orifice of the laser gas lead-in part are same as shown in FIG. 5 and FIG. 6. Hence their description is omitted. FIG. 34 is a partial sectional view of lead-in part 34 having orifice and DT 1. FIG. 35 is a sectional view along line 35—35 shown in FIG. 34.

A relay pipe 344 is designed to allow the laser gas to flow parallel to and in the same direction as the flow direction of laser gas in the DT 1.

The laser output characteristic in this structure is nearly equal to the output characteristic shown in FIG. 31. The discharge state in the DA 5 is same as the discharge state of the AFGLO having the orifice 254 shown in FIG. 28, and a stable discharge state is shown as compared with the prior art.

Figure 36:
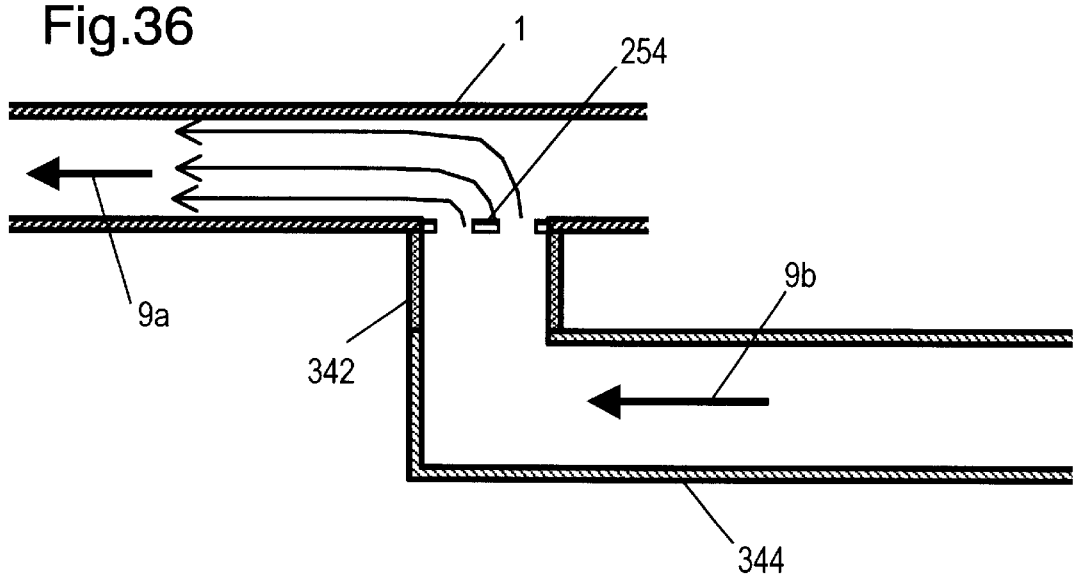
FIG. 36 is a schematic diagram of flow of laser gas estimated from the discharge state of the AFGLO having an orifice 254 shown in FIG. 35.

From the discharge state of this structure, it is estimated that the laser gas is flowing as follows as schematically shown in FIG. 36. That is, the laser gas flowing in the relay pipe 344 in the direction of arrow 9b smoothly passes through the lead-in pipe 342. As a result, a smooth flow line is formed from the laser gas passage 104 into the DT 1. In addition, the flow lines of the laser gas passing through four holes of the orifice converge so as to compensate for each unevenness. As a result, a uniform gas flow distribution is obtained in the discharge tube. Incidentally, as the shape of the laser gas relay pipe in embodiment 3, the relay pipe as shown in FIG. 11 or FIG. 12 in embodiment 1 may be also employed.

Thus, the discharge state in the discharge tube which was extremely uneven in the prior art is very stable in discharge distribution in the embodiment of the invention, and the laser output is increased substantially.

What is claimed is:
1. A laser oscillating apparatus comprising:
a discharge tube for passing laser gas inside and exciting the laser gas;
a laser gas lead-in pipe connected to said discharge tube for leading the laser gas into said discharge tube; and
a laser gas relay pipe for supplying the laser gas into said laser gas lead-in pipe, said laser gas relay pipe allowing the laser gas to flow parallel to the flowing direction of the laser gas in said discharge tube, wherein a ratio L1/D satisfies $$2 \leq L1/D \leq 20,$$

where D is an inner diameter of said discharge tube, and L1 is a distance between a central axis of said discharge tube and a central axis of said laser gas relay pipe.

2. The laser oscillating apparatus of claim 1, wherein the flowing direction of laser gas in the laser gas relay pipe is parallel to and in the same direction as the flowing direction of the laser gas in said discharge tube.

3. The laser oscillating apparatus of claim 1, wherein the flowing direction of laser gas in the laser gas relay pipe is parallel to and in the reverse direction to the flowing direction of the laser gas in said discharge tube.

4. The laser oscillating apparatus of any one of claims 1 to 3, wherein a curvature leading to a laser gas passage is formed in said laser gas relay pipe.

5. The laser oscillating apparatus of any one of claims 1 to 3, wherein the laser gas lead-in pipe connected to said laser gas relay pipe is disposed nearly at right angle to said discharge tube.

6. The laser oscillating apparatus of claim 4, wherein the laser gas lead-in pipe connected to said laser gas relay pipe is disposed nearly at right angle to said discharge tube.

7. A laser oscillating apparatus comprising:

a blower;

a discharge tube for passing laser gas inside and exciting the laser gas;

a laser gas lead-in pipe connected to said discharge tube for leading the laser gas into said discharge tube;

an orifice for impeding flow of laser gas and having a plurality of holes for passing the laser gas, disposed between the junction of said discharge tube and said laser gas lead-in pipe, wherein at least one of said plurality of holes provided in said orifice is deviated from the center.

8. The laser oscillating apparatus of claim 7, wherein the total area of the holes summing up the area of the plural holes of said orifice is at a rate of 0.5 to 0.8 to the sectional area of the discharge tube.

9. The laser oscillating apparatus of claims 7 or 8, wherein the plural holes of said orifice are nearly circular, and the diameter of each hole is smaller than the radius of the orifice.

10. A laser oscillating apparatus comprising:

a blower;

a discharge tube for passing laser gas inside and exciting the laser gas, a laser gas lead-in pipe connected to said discharge tube for leading the laser gas into said discharge tube; and a laser gas relay pipe for supplying the laser gas into said laser gas lead-in pipe, said laser gas relay pipe allowing the laser gas to flow parallel to the flowing direction of the laser gas in said discharge tube, wherein a ratio L1/D satisfied $$2 \leq L1/D \leq 20,$$

where D is an inner diameter of said discharge tube, and L1 is a distance between a central axis of said discharge tube and a central axis of said laser gas relay pipe, and an orifice for impeding flow of laser gas and having a plurality of holes for passing the laser gas, disposed between the junction of said discharge tube and said laser gas lead-in pipe, having at least one of said plurality of holes deviated from the center.

11. The laser oscillating apparatus of claim 10, wherein the flowing direction of laser gas in the laser gas relay pipe is parallel to and in the same direction as the flowing direction of the laser gas in said discharge tube.

12. The laser oscillating apparatus of claim 10, wherein the flowing direction of laser gas in the laser gas relay pipe is parallel to and in the reverse direction to the flowing direction of the laser gas in said discharge tube.

13. The laser oscillating apparatus of any one of claims 10 to 12, wherein a curvature leading to a laser gas passage is formed in said laser gas passage.

14. The laser oscillating apparatus of any one of claims 10 to 12, wherein said laser gas lead-in pipe is disposed nearly at right angle to said discharge tube.

15. The laser oscillating apparatus of any one of claims 10 to 12, wherein the total area of the holes summing up the area of the plural holes of stand orifice is at a rate of 0.5 to 0.8 to the sectional area of the discharge tube.

16. The laser oscillating apparatus of any one of claims 10 to 12, wherein the plural holes of said orifice are nearly circular, and the diameter of each hole is smaller than the radius of the orifice.

17. The laser oscillating apparatus of claim 13, wherein said laser gas lead-in pipe is disposed nearly at right angle to said discharge tube.

18. The laser oscillating apparatus of claim 14, wherein the total area of the holes summing up the area of the plural holes of said orifice is at a rate of 0.5 to 0.8 to the sectional area of the discharge tube.

19. The laser oscillating apparatus of claim 13, wherein the plural holes of said orifice are nearly circular, and the diameter of each hole is smaller than the radius of the orifice.

* * * * *